US011252614B2

(12) United States Patent
Verma et al.

(10) Patent No.: US 11,252,614 B2
(45) Date of Patent: Feb. 15, 2022

(54) COORDINATED ACCESS POINT TRANSMISSIONS

(71) Applicant: QUALCOMM Incorporated, San Diego, CA (US)

(72) Inventors: Lochan Verma, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 16/896,049

(22) Filed: Jun. 8, 2020

(65) Prior Publication Data

US 2020/0404549 A1 Dec. 24, 2020

Related U.S. Application Data

(60) Provisional application No. 62/864,991, filed on Jun. 21, 2019.

(51) Int. Cl.
*H04W 4/00* (2018.01)
*H04W 28/26* (2009.01)
(Continued)

(52) U.S. Cl.
CPC .......... *H04W 28/26* (2013.01); *H04L 5/0055* (2013.01); *H04W 24/10* (2013.01); *H04W 48/20* (2013.01); *H04W 72/0453* (2013.01)

(58) Field of Classification Search
CPC . H04W 28/26; H04W 48/20; H04W 72/0453; H04W 24/10; H04W 74/04; H04L 5/0055; H04L 5/003

(Continued)

(56) References Cited

U.S. PATENT DOCUMENTS

2014/0119220 A1 5/2014 Wang
2014/0328264 A1* 11/2014 Merlin .................. H04W 74/04
370/329

(Continued)

FOREIGN PATENT DOCUMENTS

EP 3139671 A1 3/2017

OTHER PUBLICATIONS

Abinader F.M., et al., "Distributed Wi-Fi Interference Coordination for Dense Deployments", Wireless Personal Communications, Springer, Dordrecht, NL, vol. 97, No. 1, Jun. 3, 2017 (Jun. 3, 2017), pp. 1033-1058, XP036343254, ISSN: 0929-6212, DOI: 10.1007/S11277-017-4550-3 [retrieved on Jun. 3, 2017] p. 5, paragraph 3—p. 6, paragraph 4, p. 7, paragraph 3—p. 8, paragraph 3.

(Continued)

*Primary Examiner* — Mang Hang Yeung
(74) *Attorney, Agent, or Firm* — Paradice and Li LLP; Kevin M. Donnelly

(57) ABSTRACT

This disclosure provides systems, methods and apparatus, including computer programs encoded on computer storage media, for adjusting a packet duration for triggered uplink (UL) transmissions to an access point (AP) from one or more stations (STAs). In one aspect, the AP may estimate an amount of data that a STA has queued for UL transmission and select the packet duration based on the estimated amount of queued UL data. The AP may transmit a trigger frame that solicits UL data from the STA and indicates the selected packet duration. In response, the AP may receive an UL packet from the STA and determine an amount of UL data queued in the STA based on the UL packet. In some implementations, the AP may selectively adjust the packet duration for UL transmissions based on the UL packet, the determined amount of UL data queued in the STA, or both.

30 Claims, 17 Drawing Sheets

(51) Int. Cl.
    *H04W 48/20*    (2009.01)
    *H04W 72/04*    (2009.01)
    *H04L 5/00*     (2006.01)
    *H04W 24/10*    (2009.01)

(58) Field of Classification Search
    USPC .......................................................... 370/229
    See application file for complete search history.

(56) References Cited

U.S. PATENT DOCUMENTS

| | | | |
|---|---|---|---|
| 2016/0269087 A1 | 9/2016 | Subramanian et al. | |
| 2017/0077999 A1* | 3/2017 | Asterjadhi | H04W 72/0413 |
| 2017/0180103 A1 | 6/2017 | Min et al. | |
| 2018/0027573 A1 | 1/2018 | Cariou et al. | |
| 2018/0263044 A1 | 9/2018 | Zhou et al. | |
| 2020/0037275 A1* | 1/2020 | Liu | H04W 72/0453 |
| 2020/0045555 A1* | 2/2020 | Huang | H04W 4/06 |
| 2020/0106579 A1 | 4/2020 | Cherian et al. | |
| 2020/0120544 A1* | 4/2020 | Liu | H04W 72/0406 |
| 2020/0245352 A1* | 7/2020 | Seok | H04W 72/14 |
| 2020/0267636 A1* | 8/2020 | Cavalcanti | H04W 74/0808 |
| 2020/0374872 A1* | 11/2020 | Wu | H04W 72/046 |

OTHER PUBLICATIONS

International Search Report and Written Opinion—PCT/US2019/054018—ISA/EPO—dated Jan. 20, 2020.

* cited by examiner

820

822

Transmitting a non-legacy trigger frame variant that includes a plurality of legacy frame duplicates on a plurality of respective sub-channels of the frequency bandwidth, each legacy frame duplicate including a bitmap that includes indications of the unique portions of the frequency bandwidth allocated by the first AP to the respective selected APs.

Transmitting a trigger frame to the one or more wireless stations associated with the first AP and to wireless stations associated with at least one of the selected APs, the trigger frame including synchronization information for temporally aligning the one or more wireless packets transmitted or received by each of the selected APs to or from the wireless stations associated with the respective selected APs with the one or more wireless packets transmitted or received by the first AP to or from the wireless stations associated with the first AP.

934

Receiving, from at least one of the wireless stations associated with the first AP or the one or more selected APs, a power measurement based on the trigger frame.

Receiving a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP.

Transmitting a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP.

*Figure 10D*

COORDINATED ACCESS POINT TRANSMISSIONS

CROSS-REFERENCE TO RELATED APPLICATIONS

This Patent Application claims priority to U.S. Provisional Patent Application No. 62/864,991 entitled "COORDINATED ACCESS POINT OFDMA TRANSMISSIONS" and filed on Jun. 21, 2019, which is assigned to the assignee hereof. The disclosures of all prior Applications are considered part of and are incorporated by reference in this Patent Application.

TECHNICAL FIELD

This disclosure relates generally to wireless communication, and specifically to coordinated data transmissions to or from multiple access points.

Description of the Related Technology

A wireless local area network (WLAN) may be formed by one or more access points (APs) that provide a shared wireless communication medium for use by a number of wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Many wireless networks use random channel access mechanisms to control access to a shared wireless medium. In these wireless networks, wireless devices (including APs and STAs) contend with each other to gain access to the wireless medium. The wireless device that wins the contention operation becomes the owner of a transmission opportunity (TXOP) and may use the wireless medium for a duration of the TXOP. Other wireless devices are typically prevented from transmitting data during the TXOP, for example, to prevent interference with transmissions from the TXOP owner.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a first access point (AP), and may include obtaining a transmit opportunity (TXOP) for transmitting wireless packets over a frequency bandwidth on a wireless medium; selecting one or more other APs for participation in a coordinated access point transmission session on the wireless medium; allocating, to each AP of the one or more selected APs, a unique portion of the frequency bandwidth for transmissions to or from the respective selected AP during the TXOP obtained by the first AP; reserving an unallocated portion of the frequency bandwidth for transmissions to or from the first AP during the TXOP; transmitting, to each of the one or more selected APs, control information indicating the unique portion of the frequency bandwidth allocated by the first AP to the respective selected AP; and transmitting or receiving one or more wireless packets to or from one or more wireless stations associated with the first AP over the reserved portion of the frequency bandwidth concurrently with the transmission or reception of at least portions of one or more wireless packets by the selected APs to or from one or more wireless stations associated with the respective selected APs over the respective allocated portions of the frequency bandwidth.

In some implementations, transmitting the control information includes transmitting a non-legacy trigger frame variant that includes a plurality of legacy frame duplicates on a plurality of respective sub-channels of the frequency bandwidth, each legacy frame duplicate including a bitmap that includes indications of the unique portions of the frequency bandwidth allocated by the first AP to the respective selected APs. In some instances, the control information further includes one or more of a duration of the TXOP, a maximum number of spatial streams to be used for transmissions during the TXOP, a maximum number of wireless stations for each of the selected APs for transmissions during the TXOP, a maximum packet duration for wireless packets transmitted during the TXOP, or a maximum transmit power level for transmitting wireless packets during the TXOP. In some other instances, the control information further indicates whether the coordinated access point transmission session is designated for uplink (UL) transmissions or downlink (DL) transmissions.

In some implementations, the method further includes prior to transmitting or receiving the one or more wireless packets to or from the one or more wireless stations associated with the first AP over the reserved portion of the frequency bandwidth, transmitting a trigger frame to the one or more wireless stations associated with the first AP and to wireless stations associated with at least one of the selected APs, the trigger frame including synchronization information for temporally aligning the one or more wireless packets transmitted or received by each of the selected APs to or from the wireless stations associated with the respective selected APs with the one or more wireless packets transmitted or received by the first AP to or from the wireless stations associated with the first AP. In some instances, the method further includes receiving, from at least one of the wireless stations associated with the first AP or the one or more selected APs, a power measurement based on the trigger frame.

In some implementations, the transmitting or receiving of the one or more wireless packets to or from the one or more wireless stations associated with the first AP includes transmitting, to the one or more wireless stations associated with the first AP, a trigger frame soliciting concurrent uplink (UL) transmissions over the reserved portion of the frequency bandwidth, and receiving, from the one or more wireless stations associated with the first AP, UL data transmitted on corresponding resource units (RUs) within the reserved portion of the frequency bandwidth. In some instances, the first AP receives the UL data on the reserved portion of the frequency bandwidth during the TXOP concurrently with the reception of UL data by the one or more selected APs on their respective allocated portions of the frequency bandwidth.

In some other implementations, the transmitting or receiving of the one or more wireless packets to or from the one or more wireless stations associated with the first AP includes transmitting downlink (DL) data on the reserved portion of the frequency bandwidth concurrently with DL data transmissions from the one or more selected APs on their respective allocated portions of the frequency bandwidth, and receiving, from the one or more wireless stations associated with the first AP, acknowledgement (ACK) frames on corresponding resource units (RUs) of the reserved portion of the frequency bandwidth.

Another innovative aspect of the subject matter described in this disclosure can be implemented in a wireless communication device. In some implementations, the wireless communication device may be a first access point (AP) including at least one modem, at least one processor communicatively coupled with the at least one modem, and at least one memory communicatively coupled with the at least one processor and storing processor-readable code. In some implementations, execution of the processor-readable code by the at least one processor causes the first AP to perform operations including obtaining a transmit opportunity (TXOP) for transmitting wireless packets over a frequency bandwidth on a wireless medium; selecting one or more other APs for participation in a coordinated access point transmission session on the wireless medium; allocating, to each AP of the one or more selected APs, a unique portion of the frequency bandwidth for transmissions to or from the respective selected AP during the TXOP obtained by the first AP; reserving an unallocated portion of the frequency bandwidth for transmissions to or from the first AP during the TXOP; transmitting, to each of the one or more selected APs, control information indicating the unique portion of the frequency bandwidth allocated by the first AP to the respective selected AP; and transmitting or receiving one or more wireless packets to or from one or more wireless stations associated with the first AP over the reserved portion of the frequency bandwidth concurrently with the transmission or reception of at least portions of one or more wireless packets by the selected APs to or from one or more wireless stations associated with the respective selected APs over the respective allocated portions of the frequency bandwidth.

In some implementations, transmitting the control information includes transmitting a non-legacy trigger frame variant that includes a plurality of legacy frame duplicates on a plurality of respective sub-channels of the frequency bandwidth, each legacy frame duplicate including a bitmap that includes indications of the unique portions of the frequency bandwidth allocated by the first AP to the respective selected APs. In some instances, the control information further includes one or more of a duration of the TXOP, a maximum number of spatial streams to be used for transmissions during the TXOP, a maximum number of wireless stations for each of the selected APs for transmissions during the TXOP, a maximum packet duration for wireless packets transmitted during the TXOP, or a maximum transmit power level for transmitting wireless packets during the TXOP. In some other instances, the control information further indicates whether the coordinated access point transmission session is designated for uplink (UL) transmissions or downlink (DL) transmissions.

In some implementations, the operations further include prior to transmitting or receiving the one or more wireless packets to or from the one or more wireless stations associated with the first AP over the reserved portion of the frequency bandwidth, transmitting a trigger frame to the one or more wireless stations associated with the first AP and to wireless stations associated with at least one of the selected APs, the trigger frame including synchronization information for temporally aligning the one or more wireless packets transmitted or received by each of the selected APs to or from the wireless stations associated with the respective selected APs with the one or more wireless packets transmitted or received by the first AP to or from the wireless stations associated with the first AP. In some instances, the operations further include receiving, from at least one of the wireless stations associated with the first AP or the one or more selected APs, a power measurement based on the trigger frame.

In some implementations, the transmitting or receiving of the one or more wireless packets to or from the one or more wireless stations associated with the first AP includes transmitting, to the one or more wireless stations associated with the first AP, a trigger frame soliciting concurrent uplink (UL) transmissions over the reserved portion of the frequency bandwidth, and receiving, from the one or more wireless stations associated with the first AP, UL data transmitted on corresponding resource units (RUs) within the reserved portion of the frequency bandwidth. In some instances, the first AP receives the UL data on the reserved portion of the frequency bandwidth during the TXOP concurrently with the reception of UL data by the one or more selected APs on their respective allocated portions of the frequency bandwidth.

In some other implementations, the transmitting or receiving of the one or more wireless packets to or from the one or more wireless stations associated with the first AP includes transmitting downlink (DL) data on the reserved portion of the frequency bandwidth concurrently with DL data transmissions from the one or more selected APs on their respective allocated portions of the frequency bandwidth, and receiving, from the one or more wireless stations associated with the first AP, acknowledgement (ACK) frames on corresponding resource units (RUs) of the reserved portion of the frequency bandwidth.

Another innovative aspect of the subject matter described in this disclosure can be implemented in a method for wireless communication. The method may be performed by a first access point (AP) belonging to a first basic service set (BSS), and may include transmitting an intent to participate in a coordinated access point transmission session on a wireless medium during a transmit opportunity (TXOP) obtained by a second AP belonging to a second BSS; receiving first control information indicating a unique portion of a frequency bandwidth allocated by the second AP for the transmission or reception of wireless packets by the first AP to or from wireless stations associated with the first AP and belonging to the first BSS during the TXOP; transmitting, to one or more of the wireless stations associated with the first AP and belonging to the first BSS, second control information indicating the unique portion of the frequency bandwidth allocated by the second AP for the transmission or reception of wireless packets by the first AP to or from the wireless stations associated with the first AP and belonging to the first BSS; and transmitting or receiving one or more wireless packets to or from the one or more wireless stations associated with the first AP and belonging to the first BSS over the unique portion of the frequency bandwidth allocated by the second AP concurrently with the transmission or reception of at least portions of one or more wireless packets by the second AP to or from one or more wireless stations associated with the second AP and belonging to the second BSS over one or more unallocated portions of the frequency bandwidth.

In some implementations, receiving the first control information includes receiving a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP. In some instances, the first control information further includes one or more of a duration of the TXOP, a maximum number of spatial streams to be used for transmissions during the TXOP, a maximum number of wireless stations for each of the first AP and the second AP for transmissions during the TXOP, a maximum packet duration for wireless packets transmitted during the TXOP, or a maximum transmit power level for transmitting wireless packets during the TXOP.

In some implementations, transmitting the second control information includes transmitting a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP. In some instances, the second control information further includes one or more of the size and location of the unique portion of the frequency bandwidth allocated by the second AP, a duration of the TXOP, a maximum number of spatial streams to be used for transmissions during the TXOP, a maximum number of wireless stations for each AP of the first AP and the second AP for transmissions during the TXOP, a maximum packet duration for wireless packets transmitted during the TXOP, or a maximum transmit power level for transmitting wireless packets during the TXOP.

In some implementations, the transmitting or receiving includes transmitting a trigger frame allocating one or more unique resource units (RUs) within the allocated portion of the frequency bandwidth to each wireless station of the one or more wireless stations associated with the first AP and belonging to the first BSS, and receiving uplink (UL) data from the one or more wireless stations associated with the first AP and belonging to the first BSS on the respective RUs allocated by the first AP. In some other implementations, the transmitting or receiving includes transmitting downlink (DL) data to the one or more wireless stations associated with the first AP and belonging to the first BSS over the unique portion of the frequency bandwidth allocated by the second AP concurrently with DL data transmissions from the second AP on one or more unallocated portions of the frequency bandwidth, and receiving acknowledgment frames from the one or more wireless stations associated with the first AP and belonging to the first BSS on corresponding resource units (RUs) of the unique portion of the frequency bandwidth allocated by the second AP.

Another innovative aspect of the subject matter described in this disclosure can be implemented in a wireless communication device. In some implementations, the wireless communication device may be a first access point (AP) belonging to a first basic service set (BSS), and including at least one modem, at least one processor communicatively coupled with the at least one modem, and at least one memory communicatively coupled with the at least one processor and storing processor-readable code. In some implementations, execution of the processor-readable code by the at least one processor causes the first AP to perform operations including transmitting an intent to participate in a coordinated access point transmission session on a wireless medium during a transmit opportunity (TXOP) obtained by a second AP belonging to a second BSS; receiving first control information indicating a unique portion of a frequency bandwidth allocated by the second AP for the transmission or reception of wireless packets by the first AP to or from wireless stations associated with the first AP and belonging to the first BSS during the TXOP; transmitting, to one or more of the wireless stations associated with the first AP and belonging to the first BSS, second control information indicating the unique portion of the frequency bandwidth allocated by the second AP for the transmission or reception of wireless packets by the first AP to or from the wireless stations associated with the first AP and belonging to the first BSS; and transmitting or receiving one or more wireless packets to or from the one or more wireless stations associated with the first AP and belonging to the first BSS over the unique portion of the frequency bandwidth allocated by the second AP concurrently with the transmission or reception of at least portions of one or more wireless packets by the second AP to or from one or more wireless stations associated with the second AP and belonging to the second BSS over one or more unallocated portions of the frequency bandwidth.

In some implementations, receiving the first control information includes receiving a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP. In some instances, the first control information further includes one or more of a duration of the TXOP, a maximum number of spatial streams to be used for transmissions during the TXOP, a maximum number of wireless stations for each of the first AP and the second AP for transmissions during the TXOP, a maximum packet duration for wireless packets transmitted during the TXOP, or a maximum transmit power level for transmitting wireless packets during the TXOP.

In some implementations, transmitting the second control information includes transmitting a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP. In some instances, the second control information further includes one or more of the size and location of the unique portion of the frequency bandwidth allocated by the second AP, a duration of the TXOP, a maximum number of spatial streams to be used for transmissions during the TXOP, a maximum number of wireless stations for each AP of the first AP and the second AP for transmissions during the TXOP, a maximum packet duration for wireless packets transmitted during the TXOP, or a maximum transmit power level for transmitting wireless packets during the TXOP.

In some implementations, the transmitting or receiving includes transmitting a trigger frame allocating one or more unique resource units (RUs) within the allocated portion of the frequency bandwidth to each wireless station of the one or more wireless stations associated with the first AP and belonging to the first BSS, and receiving uplink (UL) data from the one or more wireless stations associated with the first AP and belonging to the first BSS on the respective RUs allocated by the first AP. In some other implementations, the transmitting or receiving includes transmitting downlink (DL) data to the one or more wireless stations associated with the first AP and belonging to the first BSS over the unique portion of the frequency bandwidth allocated by the second AP concurrently with DL data transmissions from the second AP on one or more unallocated portions of the frequency bandwidth, and receiving acknowledgment frames from the one or more wireless stations associated with the first AP and belonging to the first BSS on corresponding resource units (RUs) of the unique portion of the frequency bandwidth allocated by the second AP.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 8C shows a flowchart illustrating an example process for wireless communication according to some implementations.

FIG. 8D shows a flowchart illustrating an example process for wireless communication according to some implementations.

FIG. 10C shows a flowchart illustrating an example process for wireless communication according to some other implementations.

FIG. 10D shows a flowchart illustrating an example process for wireless communication according to some other implementations.

Like reference numbers and designations in the various drawings indicate like elements.

DETAILED DESCRIPTION

Figure 1:
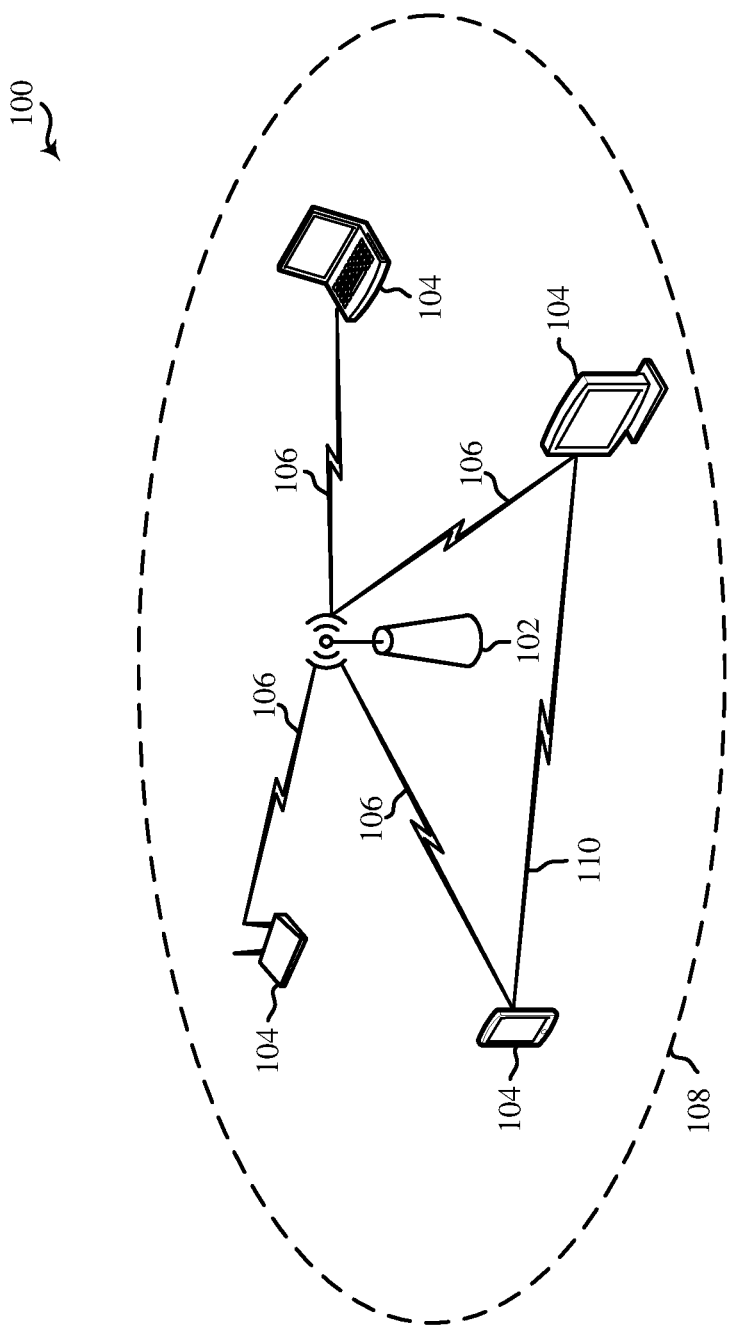
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to sharing the frequency resources of a wireless medium between a group of wireless communication devices, irrespective of which wireless communication device is the owner of a TXOP on the wireless medium. Some implementations more specifically relate to a first AP obtaining a TXOP on a wireless medium and sharing the frequency resources of the wireless medium with one or more other APs during the TXOP. In some implementations, the first AP may select one or more other APs for participation in a coordinated access point transmission (CAP TX) session during which the first AP and each of the selected APs may concurrently receive uplink (UL) data from one or more wireless stations associated with each AP of the first AP and the selected APs or concurrently transmit downlink (DL) data to the respective one or more wireless stations associated with each AP of the first AP and the selected APs on the wireless medium during the TXOP. In some implementations, the first AP may receive information indicating whether nearby APs intend to participate in the coordinated access point transmission session, and may select one or more of the nearby APs to participate in the coordinated access point transmission session based at least in part on the received indications.

In some implementations, the first AP may allocate a unique portion of the frequency bandwidth to each of the selected APs for concurrent UL transmissions or concurrent DL transmissions during the TXOP obtained by the first AP. The first AP may transmit, to each of the one or more selected APs, control information indicating the unique portion of the frequency bandwidth allocated by the first AP to the respective selected AP, and each of the selected APs may inform their respective associated wireless stations of the respective unique portion of the frequency bandwidth allocated by the first AP. In some implementations, the first AP may transmit or receive one or more wireless packets to or from one or more wireless stations associated with the first AP over the reserved portion of the frequency bandwidth concurrently with the transmission or reception of at least portions of one or more wireless packets by the selected APs to or from one or more wireless stations associated with the respective selected APs over their respective allocated portions of the frequency bandwidth.

The control information may contain any suitable resource allocation and transmission information including, for example, one or more of the sizes and locations of the unique portions of the frequency bandwidth allocated by the first AP, a duration of the TXOP, a maximum number of spatial streams to be used for transmissions during the TXOP, a maximum number of wireless stations for each of the selected APs for transmissions during the TXOP, a maximum packet duration for wireless packets transmitted during the TXOP, or a maximum transmit power level for transmitting wireless packets during the TXOP. In some implementations, the control information may be transmitted in an HE or EHT trigger frame variant in a non-HT duplicate format on each portion or channel of the frequency bandwidth. In this way, each of the selected APs may receive at least one of the non-HT duplicates, irrespective of the particular channel upon which each respective AP normally operates.

Particular implementations of the subject matter described in this disclosure can be implemented to realize one or more of the following potential advantages. By allowing a group of APs to participate in a coordinated access point transmission session during which each of the participating APs may concurrently transmit or receive wireless packets on a corresponding portion of the frequency bandwidth irrespective of which AP owns a given TXOP, aspects of the present disclosure may improve medium utilization and reduce congestion on the wireless medium. Also, by allocating a unique portion of the frequency bandwidth to each of the participating APs and their respective basic service sets (BSSs), aspects of the present disclosure may allow concurrent UL transmissions and concurrent DL transmissions across the participating BSSs.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
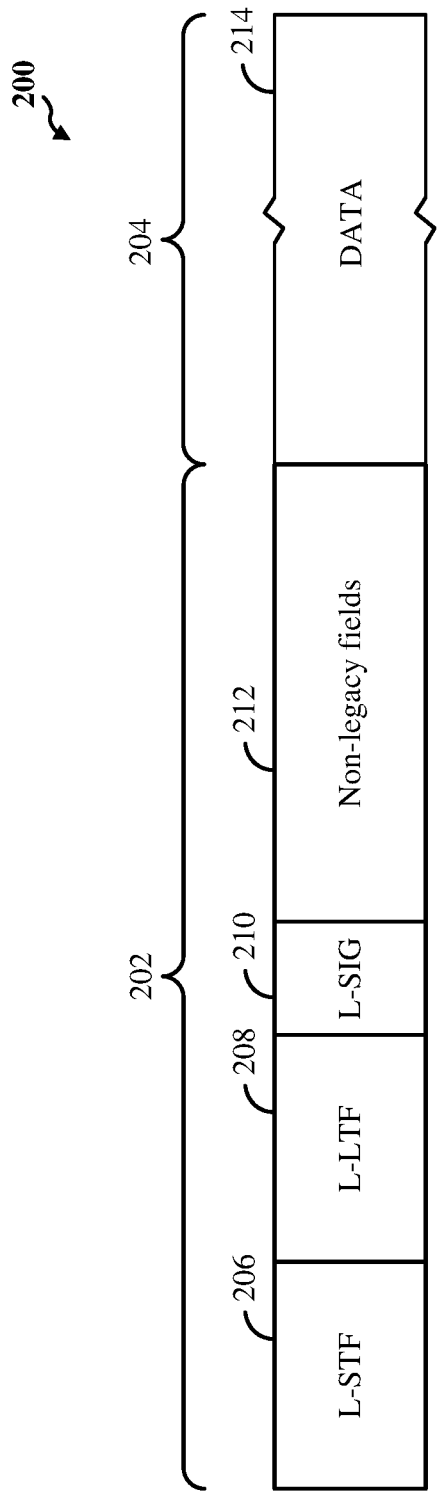
FIG. 2A shows an example protocol data unit (PDU) usable for communications between an access point (AP) and a number of stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
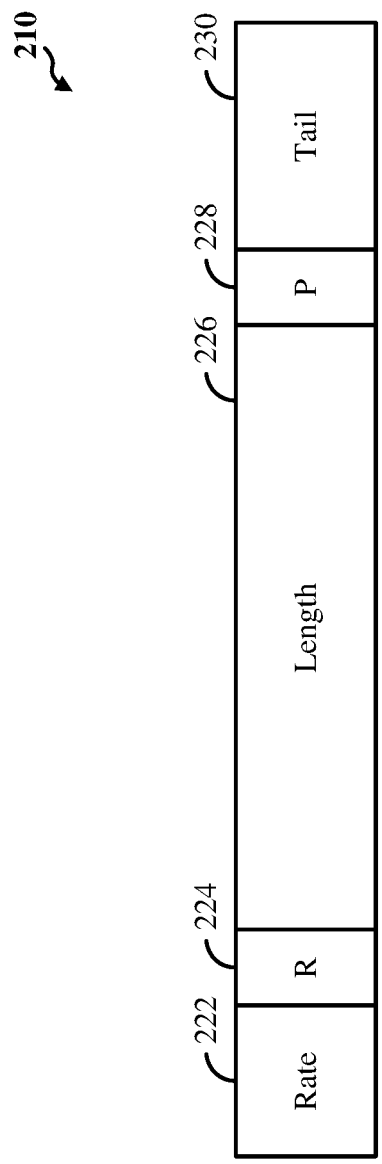
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
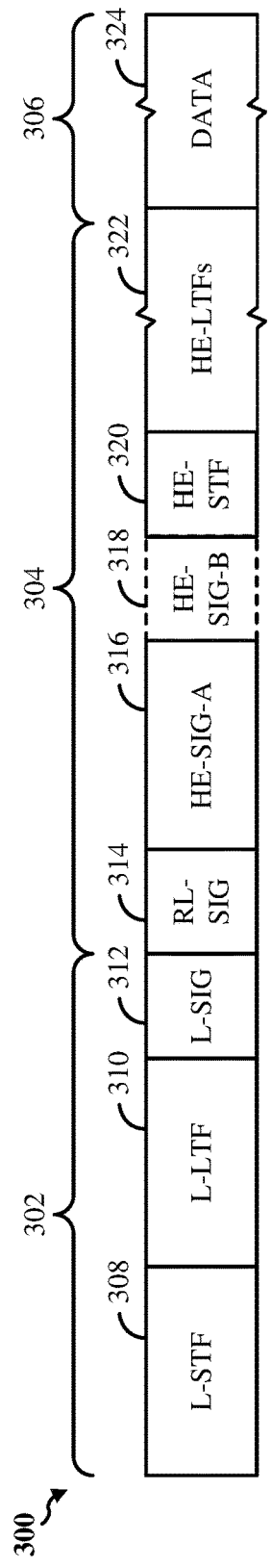
FIG. 3A shows an example physical layer (PHY) preamble usable for communications between an AP and each of a number of STAs.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
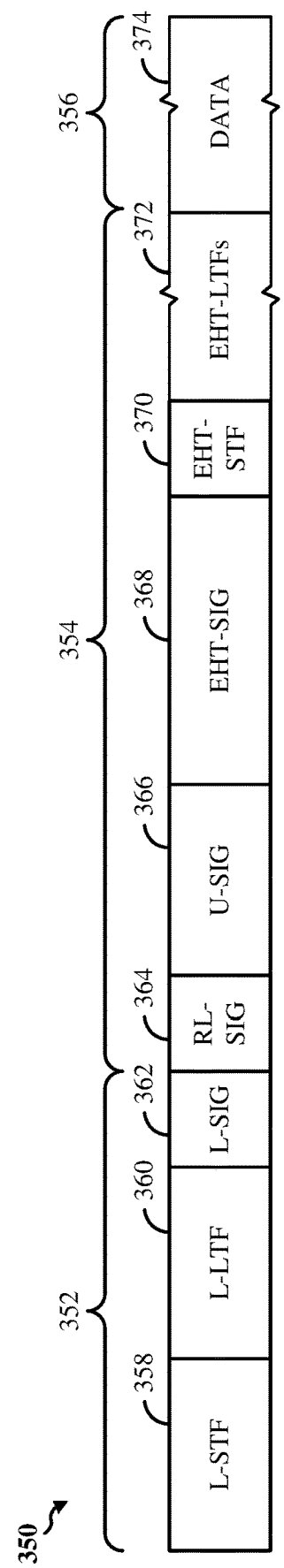
FIG. 3B shows another example PHY preamble usable for communications between an AP and each of a number of stations.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

FIG. 3C shows an example signal field 380 that may be carried in a WLAN PPDU. In implementations for which the signal field 380 is carried in an HE PPDU, the signal field 380 may be, or may correspond to, a HE-SIG-A field (such as the HE-SIG-A field 316 of the PPDU 300 of FIG. 3A). In implementations for which the signal field 380 is carried in an EHT PPDU, the signal field 380 may be, or may correspond to, an EHT-SIG field (such as the EHT-SIG field 368 of the PPDU 350 of FIG. 3B). The signal field 380 may include an UL/DL subfield 382 indicating whether the PPDU 400 is sent UL or DL, may include a SIGB-MCS subfield 384 indicating the MCS for the HE-SIGB field 412, and may include a SIGB DCM subfield 386 indicating whether or not the HE-SIG-B field 412 is modulated with dual carrier modulation (DCM). The signal field 380 may further include BSS color field 388 indicating a BSS color identifying the BSS. Each device in a BSS may identify itself with the same BSS color. Thus, receiving a transmission having a different BSS color indicates the transmission is from another BSS, such as an OBSS.

The signal field 380 may further include a spatial reuse subfield 390 indicating whether spatial reuse is allowed during transmission of the corresponding PPDU. The signal field 380 may further include a bandwidth subfield 392 indicating a bandwidth of the PPDU data field, such as 20 MHz, 40 MHz, 80 MHz, 160 MHz, and so on. The signal field 380 may further include a number of HE-SIG-B symbols or MU-MIMO users subfield 394 indicating either a number of OFDM symbols in the HE-SIG-B field 412 or a number of MU-MIMO users. The signal field 380 may further include a SIGB compression subfield 396 indicating whether or not a common signaling field is present, may include a GI+LTF size subfield 398 indicating the guard interval (GI) duration and the size of the non-legacy LTFs. The signal field 380 may further include a doppler subfield 399 indicating whether a number of OFDM symbols in the PPDU data field is larger than a signaled midamble periodicity plus one, and the midamble is present, or that the number of OFDM symbols in the PPDU data field data field 418 is less than or equal to the signaled midamble periodicity plus 1, that the midamble is not present, but that the channel is fast varying.

Figure 4:
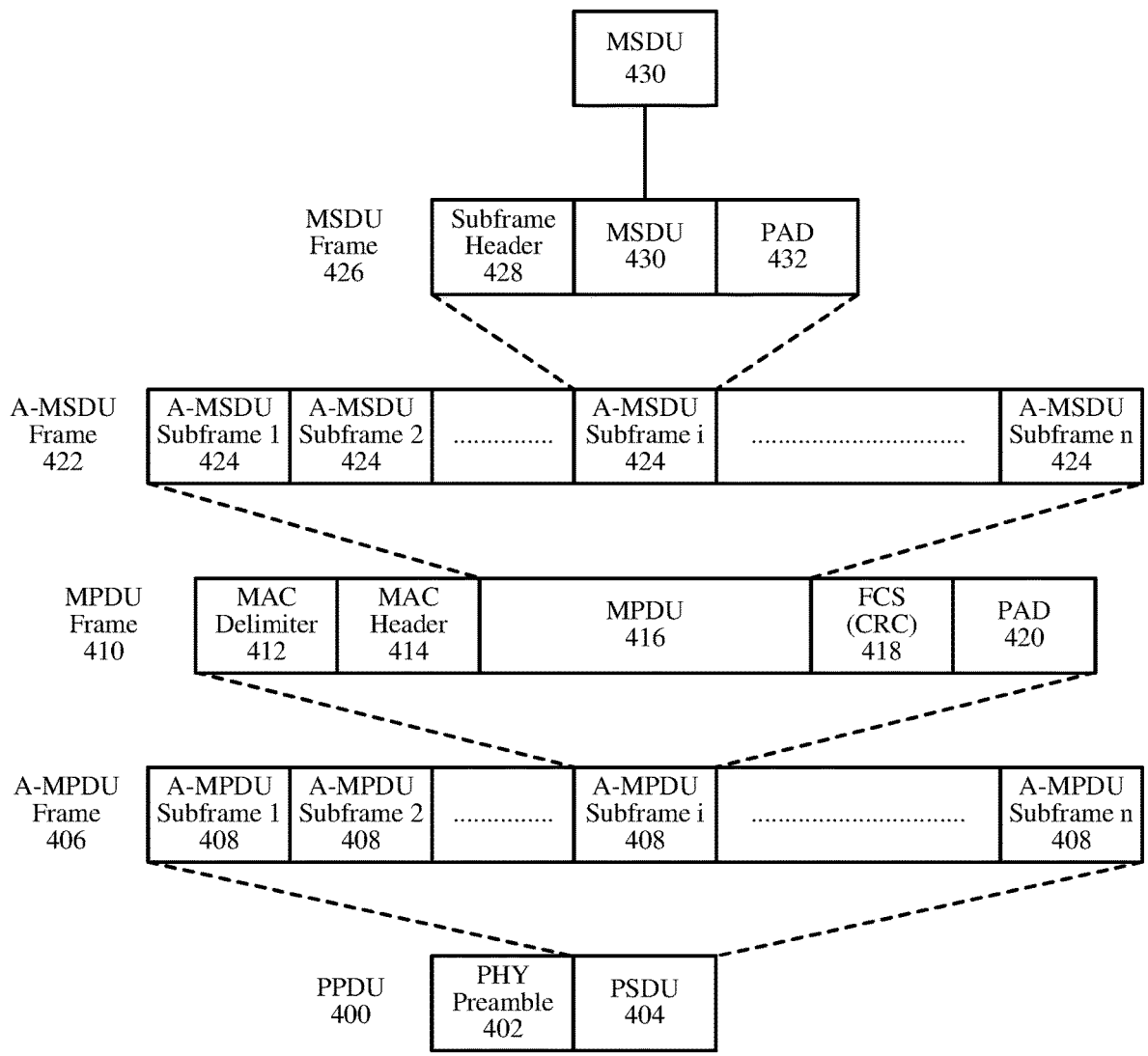
FIG. 4 shows an example physical layer convergence protocol (PLCP) protocol data unit (PPDU) usable for communications between an AP and a number of STAs.

FIG. 4 shows an example PPDU 400 usable for communications between an AP 102 and one or more STAs 104. As described above, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 may also include a frame check sequence (FCS) field 418 for error detection (for example, the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first received signal strength indication (RSSI) detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
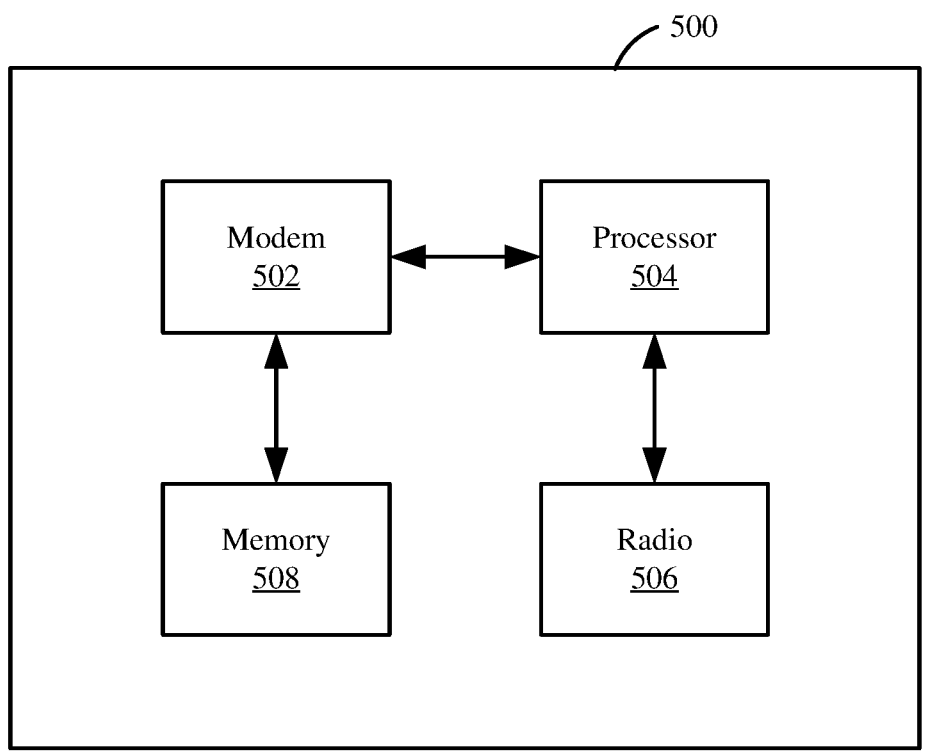
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more processors, processing blocks or processing elements 504 (collectively "the processor 504") coupled with the modem 502. In some implementations, the wireless communication device 500 additionally includes one or more radios 506 (collectively "the radio 506") coupled with the modem 502. In some implementations, the wireless communication device 500 further includes one or more memory blocks or elements 508 (collectively "the memory 508") coupled with the processor 504 or the modem 502.

The modem 502 can include an intelligent hardware block or device such as, for example, an application-specific integrated circuit (ASIC), among other examples. The modem 502 is generally configured to implement a PHY layer, and in some implementations, also a portion of a MAC layer (for example, a hardware portion of the MAC layer). For example, the modem 502 is configured to modulate packets and to output the modulated packets to the radio 506 for transmission over the wireless medium. The modem 502 is similarly configured to obtain modulated packets received by the radio 506 and to demodulate the packets to provide demodulated packets. In addition to a modulator and a demodulator, the modem 502 may further include digital signal processing (DSP) circuitry, automatic gain control (AGC) circuitry, a coder, a decoder, a multiplexer and a demultiplexer. For example, while in a transmission mode, data obtained from the processor 506 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 506. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 506, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 506) for processing, evaluation or interpretation.

The radio 506 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 506, which then transmits the symbols via the coupled antennas. Similarly, symbols received via the antennas are obtained by the radio 506, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 506 and the modem 502, and processes information to be output through the modem 502 and the radio 506 for transmission through the wireless medium. For example, the processor 506 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
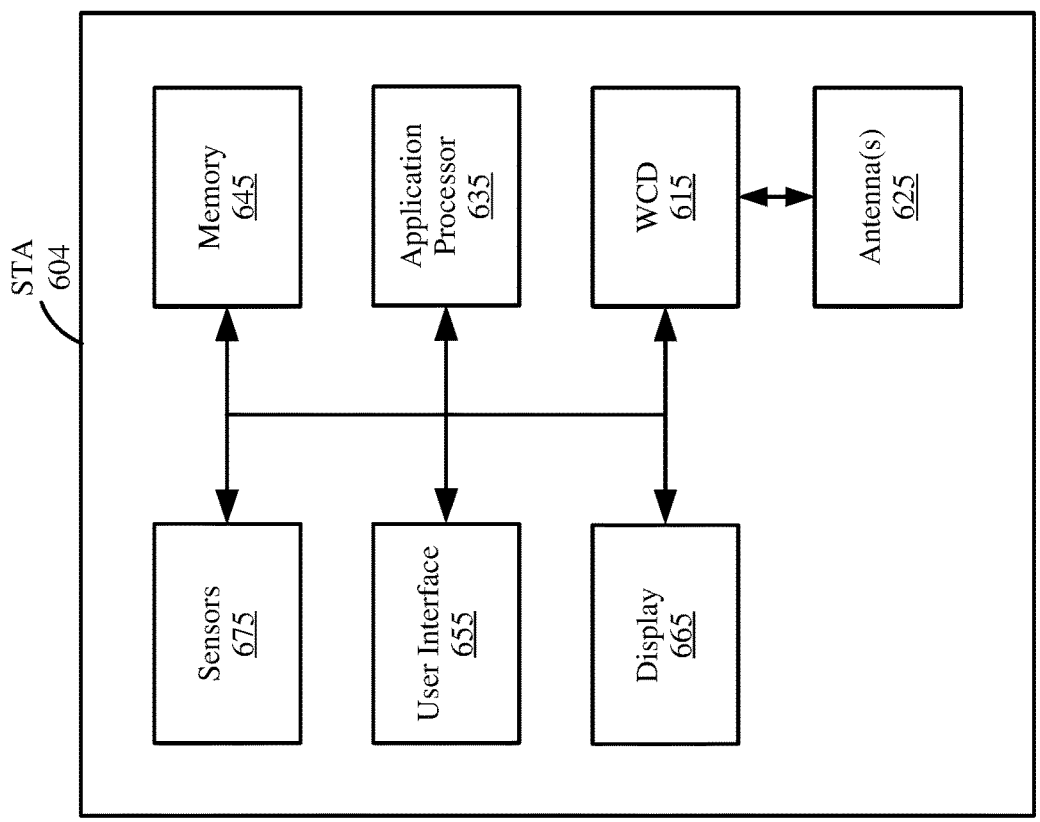
FIG. 6B shows a block diagram of an example station (STA).
Figure 6A:
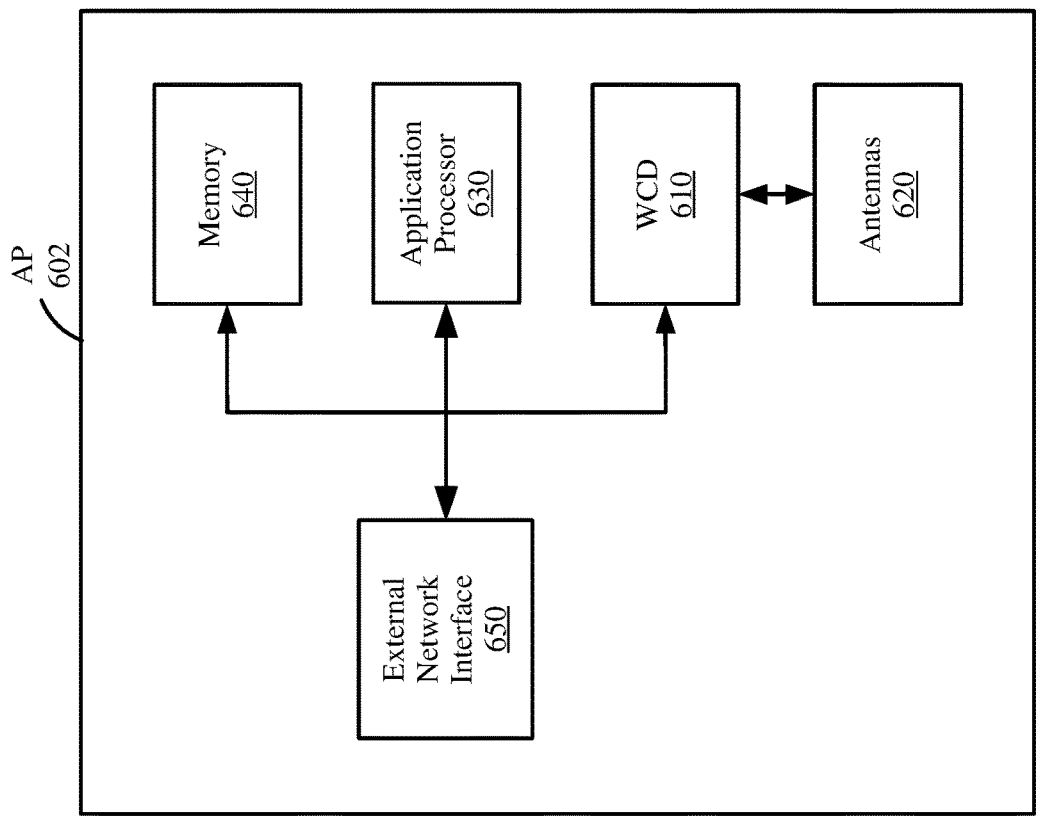
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As mentioned above, many wireless networks use random channel access mechanisms to control access to a shared wireless medium, for example, such that after a particular AP wins a medium access contention operation and obtains a TXOP, only that particular AP transmits DL data or receives UL data during the TXOP. In wireless networks compliant with the IEEE 802.11ax standards, nearby APs typically do not coordinate their DL transmissions or their UL transmissions with each other, even in instances where each of a group of nearby APs is within a vicinity of each other and essentially shares access to the frequency bandwidth of the same wireless medium (such that each of the APs in the group may contend with each other for access to the shared wireless medium).

Various implementations relate generally to sharing the frequency resources of a wireless medium between a group of wireless communication devices, irrespective of which wireless communication device is the owner of a TXOP on the wireless medium. Some implementations more specifically relate to a first AP obtaining a TXOP on a wireless medium and sharing the frequency resources of the wireless medium with one or more other APs during the TXOP. In some implementations, the first AP may select one or more other APs for participation in a coordinated access point transmission (CAP TX) session during which the first AP and each of the selected APs may concurrently receive uplink (UL) data from one or more wireless stations associated with each AP of the first AP and the selected APs or concurrently transmit downlink (DL) data to the respective one or more wireless stations associated with each AP of the first AP and the selected APs on the wireless medium during the TXOP. In some implementations, the first AP may receive information indicating whether nearby APs intend to participate in the coordinated access point transmission session, and may select one or more of the nearby APs to participate in the coordinated access point transmission session based at least in part on the received indications. The first AP may also select APs to participate in the coordinated access point transmission session by receiving capability information from the nearby APs, and using the received capability information to select the APs to participate in the coordinated access point transmission session.

In some implementations, the first AP may allocate a unique portion of the frequency bandwidth to each of the selected APs for concurrent UL transmissions or concurrent DL transmissions during the TXOP obtained by the first AP. The first AP may transmit, to each of the one or more selected APs, control information indicating the unique portion of the frequency bandwidth allocated by the first AP to the respective selected AP, and each of the selected APs may inform their associated wireless stations of the respective unique portion of the frequency bandwidth allocated by the first AP. In some implementations, the first AP may transmit or receive one or more wireless packets to or from one or more wireless stations associated with the first AP over the reserved portion of the frequency bandwidth concurrently with the transmission or reception of at least portions of one or more wireless packets by the selected APs to or from one or more wireless stations associated with the respective selected APs over their respective allocated portions of the frequency bandwidth.

The control information may contain any suitable resource allocation and transmission information including, for example, one or more of the sizes and locations of the unique portions of the frequency bandwidth allocated by the first AP, a duration of the TXOP, a maximum number of spatial streams to be used for transmissions during the TXOP, a maximum number of wireless stations for each of the selected APs for transmissions during the TXOP, a maximum packet duration for wireless packets transmitted during the TXOP, or a maximum transmit power level for transmitting wireless packets during the TXOP. In some implementations, the control information may be transmitted in an HE or EHT trigger frame variant in a non-HT duplicate format on each portion or channel of the frequency bandwidth. In this way, each of the selected APs may receive at least one of the non-HT duplicates, irrespective of the particular channel upon which each respective AP normally operates.

Figure 7:
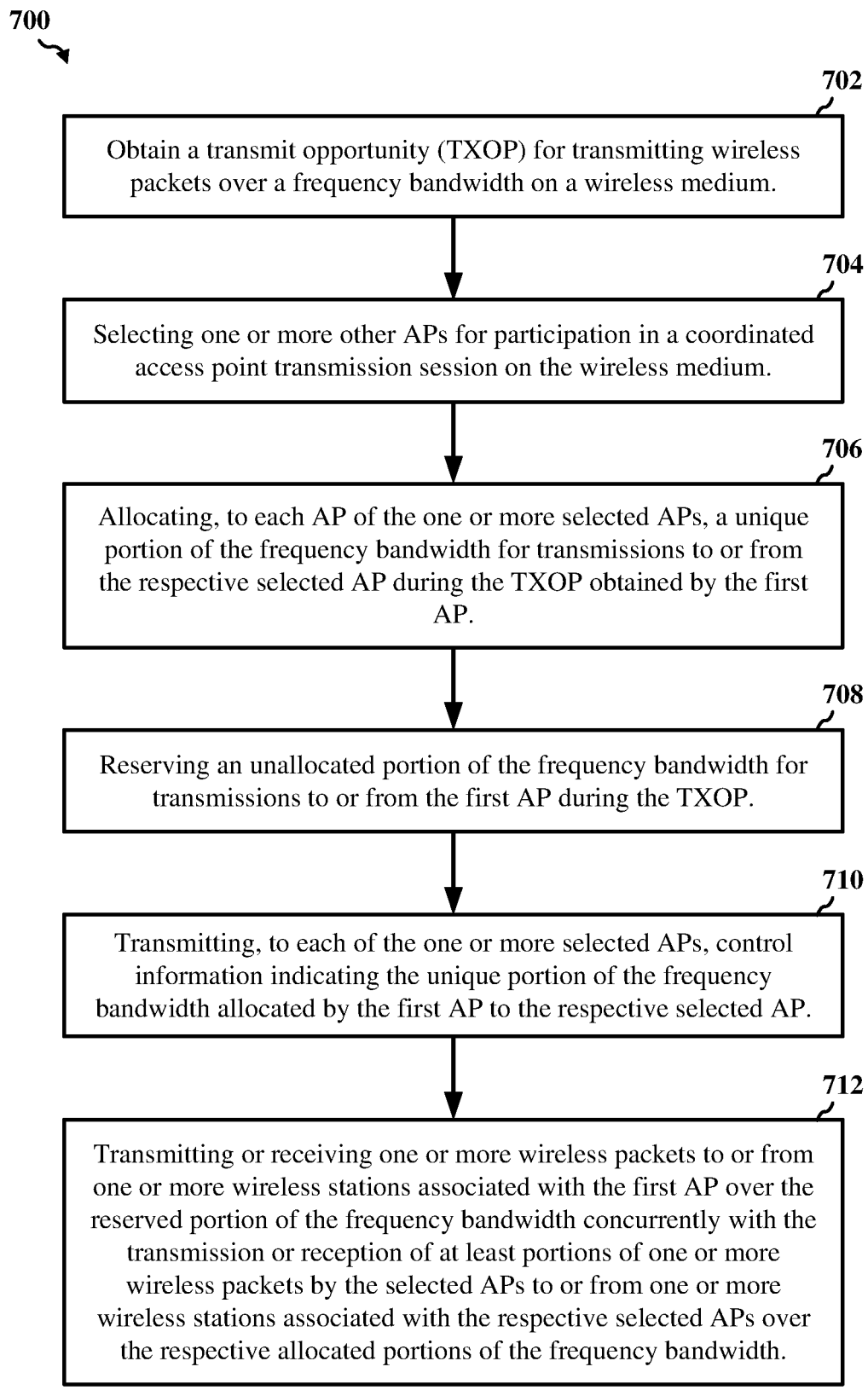
FIG. 7 shows a flowchart illustrating an example process for wireless communication according to some implementations.

FIG. 7 shows a flowchart illustrating an example process 700 for wireless communication according to some implementations. The process 700 may be performed by a wireless communication device such as the wireless communication device 500 described above with reference to FIG. 5. In some implementations, the process 700 may be performed by a wireless communication device operating as or within an AP, such as one of the APs 102 and 602 described above with reference to FIGS. 1 and 6A, respectively. In some implementations, the process 700 is performed by a first AP and begins in block 702 with obtaining a transmit opportunity (TXOP) for transmitting wireless packets over a frequency bandwidth on a wireless medium. In block 704, the process 700 proceeds with selecting one or more other APs for participation in a coordinated access point transmission session on the wireless medium. In block 706, the process 700 proceeds with allocating, to each AP of the one or more selected APs, a unique portion of the frequency bandwidth for transmissions to or from the respective selected AP during the TXOP obtained by the first AP. In block 708, the process 700 proceeds with reserving an unallocated portion of the frequency bandwidth for transmissions to or from the first AP during the TXOP. In block 710, the process 700 proceeds with transmitting, to each of the one or more selected APs, control information indicating the unique portion of the frequency bandwidth allocated by the first AP to the respective selected AP. In block 712, the process 700 proceeds with transmitting or receiving one or more wireless packets to or from one or more wireless stations associated with the first AP over the reserved portion of the frequency bandwidth concurrently with the transmission or reception of at least portions of one or more wireless packets by the selected APs to or from one or more wireless stations associated with the respective selected APs over the respective allocated portions of the frequency bandwidth.

In some implementations, selecting the one or more other APs in block 702 includes receiving an intent from each of a plurality of nearby APs to participate in the coordinated access point transmission session, determining capabilities and preferences of each of the nearby APs, and determining which of the nearby APs are to participate in the coordinated access point transmission session based at least in part on the determined capabilities and preferences.

In some implementations, allocating unique portions of the frequency bandwidth in block 704 includes receiving indications of one or more of a preferred frequency bandwidth or a preferred number of spatial streams from each of the identified APs, and determining an amount of frequency bandwidth (if any) to be allocated to each of the identified APs.

In some implementations, reserving the un-allocated portion of the frequency bandwidth in block 706 includes identifying portions of the frequency bandwidth that were not allocated by the first AP to other APs for data transmissions during the TXOP, and reserving the identified unallocated portions of the frequency bandwidth to the first AP for data transmissions to or from one or more wireless stations associated with the first AP during the TXOP.

In some implementations, the indication frame in block 708 may be an HE or EHT trigger frame variant transmitted from the first AP in a non-HT duplicate format on each portion or channel of the frequency bandwidth, for example, so that each of the selected APs receives at least one of the non-HT duplicates, irrespective of the particular operating channels of the selected APs.

In some implementations, transmitting or receiving the one or more wireless packets in block 710 includes concurrently receiving, from each of the one or more wireless stations associated with the first AP, UL data transmitted on a corresponding one of a plurality of RUs within the reserved portion of the frequency bandwidth. In other implementations, transmitting or receiving the one or more wireless packets in block 708 includes transmitting DL data on the reserved portion of the frequency bandwidth concurrently with the transmission of DL data from each of the selected APs on their allocated portions of the frequency bandwidth.

In one or more implementations, the process 700 described with reference to FIG. 7 may be preceded by a feedback phase. In some implementations, the AP may transmit a request frame that solicits feedback information indicating an intent or a capability (or both) of nearby access points (such as AP2 and AP3) to participate in a coordinated access point transmission session with AP1. One or more of the nearby access points (such as AP2 and AP3) may respond by transmitting a response frame indicating whether the access point intends or is capable of (or both) participating in the coordinated access point transmission session with AP1. The response frame may indicate one or more of a preferred bandwidth for allocation to the access point during the coordinated access point transmission session or a preferred number of spatial streams to be used by the access point during the coordinated access point transmission session. In some other implementations, one or more nearby access points (such as AP2 and AP3) may include intent and capability information pertaining to the coordinated access point transmission session in beacon frames or other suitable management frames (such as without being requested by AP1).

Figure 8A:
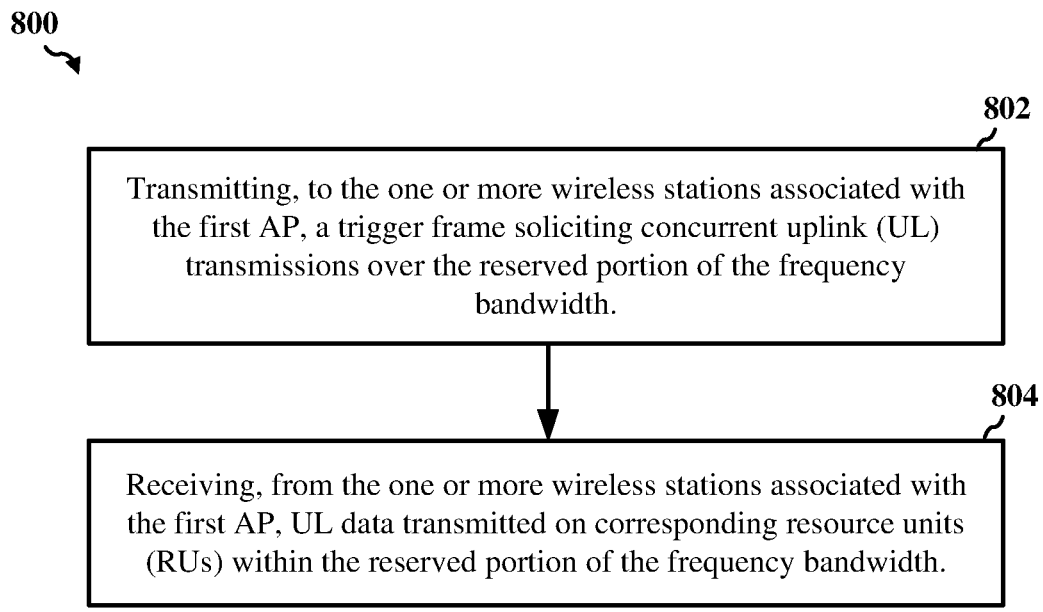
FIG. 8A shows a flowchart illustrating an example process for wireless communication according to some implementations.

FIG. 8A shows a flowchart illustrating an example process 800 for wireless communication according to some implementations. The process 800 may be performed by a wireless communication device such as the wireless communication device 500 described above with reference to FIG. 5. In some implementations, the process 800 may be performed by a wireless communication device operating as or within an AP, such as one of the APs 102 and 602 described above with reference to FIGS. 1 and 6A, respectively. With reference to FIG. 7, in some implementations, the process 800 may be an example of transmitting or receiving the one or more wireless packets to or from one or more wireless stations associated with the first AP in block 712 of the process 700, and begins in block 802 with transmitting, to the one or more wireless stations associated with the first AP, a trigger frame soliciting concurrent uplink (UL) transmissions over the reserved portion of the frequency bandwidth. In block 804, the process 800 proceeds with receiving, from the one or more wireless stations associated with the first AP, UL data transmitted on corresponding resource units (RUs) within the reserved portion of the frequency bandwidth.

In some implementations, transmitting the trigger frame in block 802 may include transmitting the trigger frame to wireless stations associated with the first AP concurrently with the transmission of another trigger frame from each of the selected APs to their respective associated wireless stations.

In some implementations, the UL data in block 804 may be concurrently transmitted as orthogonal frequency-division multiple access (OFDMA) transmissions. The transmission of wireless packets from wireless stations associated with the first AP may begin at the same time as the transmission of wireless packets from wireless stations associated with each of the selected APs. The first AP may transmit an acknowledgement (ACK) frame to each of the transmitting wireless stations to confirm receipt of the UL data in block 804. In some implementations, the first AP may transmit the ACK frames as a Multi-STA BlockAck frame.

Figure 8B:
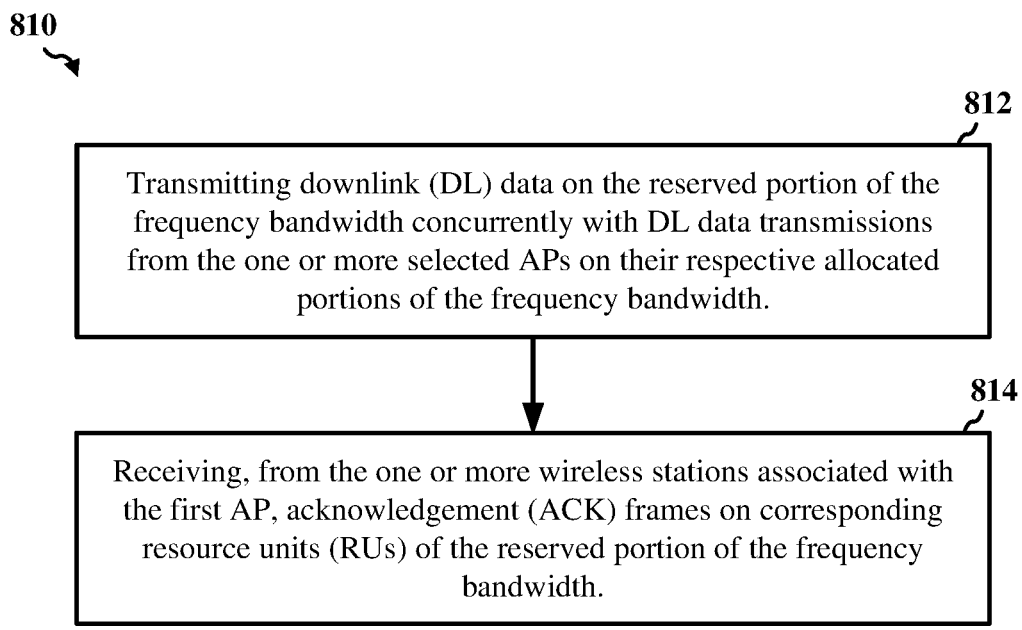
FIG. 8B shows a flowchart illustrating an example process for wireless communication according to some implementations.

FIG. 8B shows a flowchart illustrating an example process 810 for wireless communication according to some implementations. The process 810 may be performed by a wireless communication device such as the wireless communication device 500 described above with reference to FIG. 5. In some implementations, the process 810 may be performed by a wireless communication device operating as or within an AP, such as one of the APs 102 and 602 described above with reference to FIGS. 1 and 6A, respectively. With reference to FIG. 7, in some implementations, the process 810 may be an example of transmitting or receiving one or more wireless packets to or from one or more wireless stations associated with the first AP in block 712 of the process 700, and begins in block 812 with transmitting downlink (DL) data on the reserved portion of the frequency bandwidth concurrently with DL data transmissions from the one or more selected APs on their respective allocated portions of the frequency bandwidth. In block 814, the process 810 proceeds with receiving, from the one or more wireless stations associated with the first AP, acknowledgement (ACK) frames on corresponding resource units (RUs) of the reserved portion of the frequency bandwidth.

In some implementations, the DL data in block 812 may be concurrently transmitted as orthogonal frequency-division multiple access (OFDMA) transmissions. The transmission of wireless packets from the first AP may begin at the same time as the transmission of wireless packets from each of the selected APs.

FIG. 8C shows a flowchart illustrating an example process 820 for wireless communication according to some implementations. The process 820 may be performed by a wireless communication device such as the wireless communication device 500 described above with reference to FIG. 5. In some implementations, the process 820 may be performed by a wireless communication device operating as or within an AP, such as one of the APs 102 and 602 described above with reference to FIGS. 1 and 6A, respectively. With reference to FIG. 7, in some implementations, the process 820 may be an example of transmitting the control information in block 710 of the process 700, and begins in block 822 with transmitting a non-legacy trigger frame variant that includes a plurality of legacy frame duplicates on a plurality of respective sub-channels of the frequency bandwidth, each legacy frame duplicate including a bitmap that includes indications of the unique portions of the frequency bandwidth allocated by the first AP to the respective selected APs.

FIG. 8D shows a flowchart illustrating an example process 830 for wireless communication according to some implementations. The process 830 may be performed by a wireless communication device such as the wireless communication device 500 described above with reference to FIG. 5. In some implementations, the process 830 may be performed by a wireless communication device operating as or within an AP, such as one of the APs 102 and 602 described above with reference to FIGS. 1 and 6A, respectively. With reference to FIG. 7, in some implementations, the process 830 may be performed prior to transmitting or receiving the one or more wireless packets to or from the one or more wireless stations associated with the first AP in block 712 of the process 700, and begins in block 832 with transmitting a trigger frame to the one or more wireless stations associated with the first AP and to wireless stations associated with at least one of the selected APs. In block 834, the process 830 proceeds with receiving, from at least one of the wireless stations associated with the first AP or the one or more selected APs, a power measurement based on the trigger frame.

In some implementations, the trigger frame in block 832 includes synchronization information for temporally aligning the one or more wireless packets transmitted or received by each of the selected APs to or from the wireless stations associated with the respective selected APs with the one or more wireless packets transmitted or received by the first AP to or from the wireless stations associated with the first AP.

In some implementations, the power measurement in block 834 may be an RSSI value of the trigger frame measured by the respective wireless station.

Figure 9:
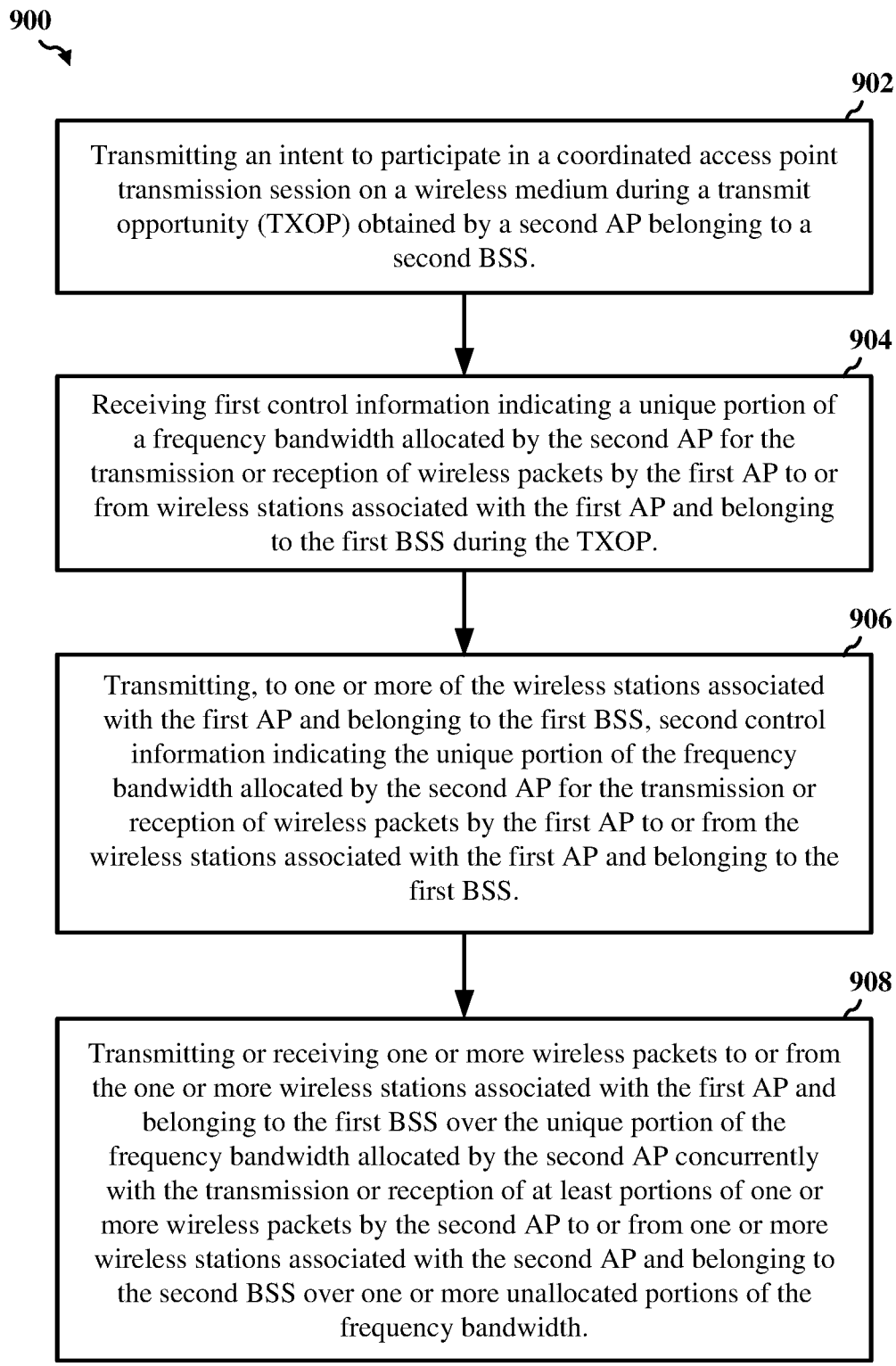
FIG. 9 shows a flowchart illustrating an example process for wireless communication according to some other implementations.

FIG. 9 shows a flowchart illustrating an example process 900 for wireless communication according to some implementations. The process 900 may be performed by a wireless communication device such as the wireless communication device 500 described above with reference to FIG. 5. In some implementations, the process 900 may be performed by a wireless communication device operating as or within an AP, such as one of the APs 102 and 602 described above with reference to FIGS. 1 and 6A, respectively. In some implementations, the process 900 begins in block 902 with transmitting an intent to participate in a coordinated access point transmission session on a wireless medium during a transmit opportunity (TXOP) obtained by a second AP belonging to a second BSS. In block 904, the process proceeds with receiving first control information indicating a unique portion of a frequency bandwidth allocated by the second AP for the transmission or reception of wireless packets by the first AP to or from wireless stations associated with the first AP and belonging to the first BSS during the TXOP. In block 906, the process 900 proceeds with transmitting, to one or more of the wireless stations associated with the first AP and belonging to the first BSS, second control information indicating the unique portion of the frequency bandwidth allocated by the second AP for the transmission or reception of wireless packets by the first AP to or from the wireless stations associated with the first AP and belonging to the first BSS. In block 908, the process 900 proceeds with transmitting or receiving one or more wireless packets to or from the one or more wireless stations associated with the first AP and belonging to the first BSS over the unique portion of the frequency bandwidth allocated by the second AP concurrently with the transmission or reception of at least portions of one or more wireless packets by the second AP to or from one or more wireless stations associated with the second AP and belonging to the second BSS over one or more unallocated portions of the frequency bandwidth.

In some implementations, transmitting the intent in block 902 includes transmitting a frame indicating whether the first AP is capable of participating in coordinated access point transmission sessions. The frame may also include one or more of a preferred frequency bandwidth to be allocated to the first AP or a preferred number of spatial streams upon which the first AP is to transmit or receive data. In some aspects, the frame may be a response frame transmitted by the first AP in response to receiving a request frame from the second AP. In other aspects, the frame may be a beacon frame (or any other suitable management frame or control frame).

In some implementations, the first control information in block 904 may include at least one of the sizes and locations of the unique portions of the frequency bandwidth allocated by the second AP, a duration of the TXOP, a maximum number of spatial streams to be used for transmissions during the TXOP, a maximum number of wireless stations for each of the selected APs for transmissions during the TXOP, a maximum packet duration for wireless packets transmitted during the TXOP, or a maximum transmit power level for transmitting wireless packets during the TXOP.

In some implementations, transmitting the second control information in block 906 includes transmitting, to each of the one or more wireless stations associated with the first AP and belonging to the first BSS, a forward indication frame including the size and location of the unique portion of the frequency bandwidth allocated by the second AP.

In some implementations, transmitting or receiving the one or more wireless packets in block 908 includes concurrently receiving, from each of the one or more wireless stations associated with the first AP and belonging to the first BSS, UL data on a corresponding one of a plurality of RUs within the unique portion of the frequency bandwidth allocated by the second AP. In other implementations, transmitting or receiving the one or more wireless packets in block 908 includes transmitting DL data on the unique portion of the frequency bandwidth allocated by the second AP concurrently with the transmission of DL data from the second AP to one or more wireless stations associated with the second AP and belonging to the second BSS on respective unallocated portions of the frequency bandwidth.

Figure 10A:
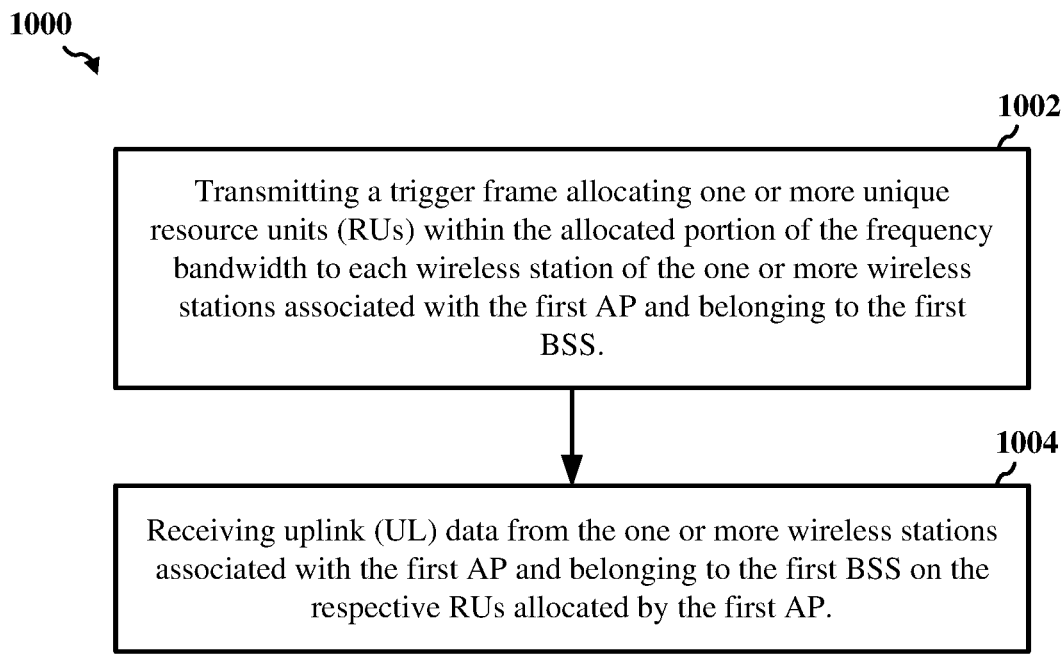
FIG. 10A shows a flowchart illustrating an example process for wireless communication according to some other implementations.

FIG. 10A shows a flowchart illustrating an example process 1000 for wireless communication according to some implementations. The process 1000 may be performed by a wireless communication device such as the wireless communication device 500 described above with reference to FIG. 5. In some implementations, the process 1000 may be performed by a wireless communication device operating as or within an AP, such as one of the APs 102 and 602 described above with reference to FIGS. 1 and 6A, respectively. With reference to FIG. 9, in some implementations, the process 1000 may be one example of transmitting or receiving the one or more wireless packets to or from the one or more wireless stations associated with the first AP in block 908 of the process 900, and begins in block 1002 with transmitting a trigger frame allocating one or more RUs within the allocated portion of the frequency bandwidth to each wireless station of the one or more wireless stations associated with the first AP and belonging to the first BSS. In block 1004, the process 1000 proceeds with receiving uplink (UL) data from the one or more wireless stations associated with the first AP and belonging to the first BSS on the respective RUs allocated by the first AP.

Figure 10B:
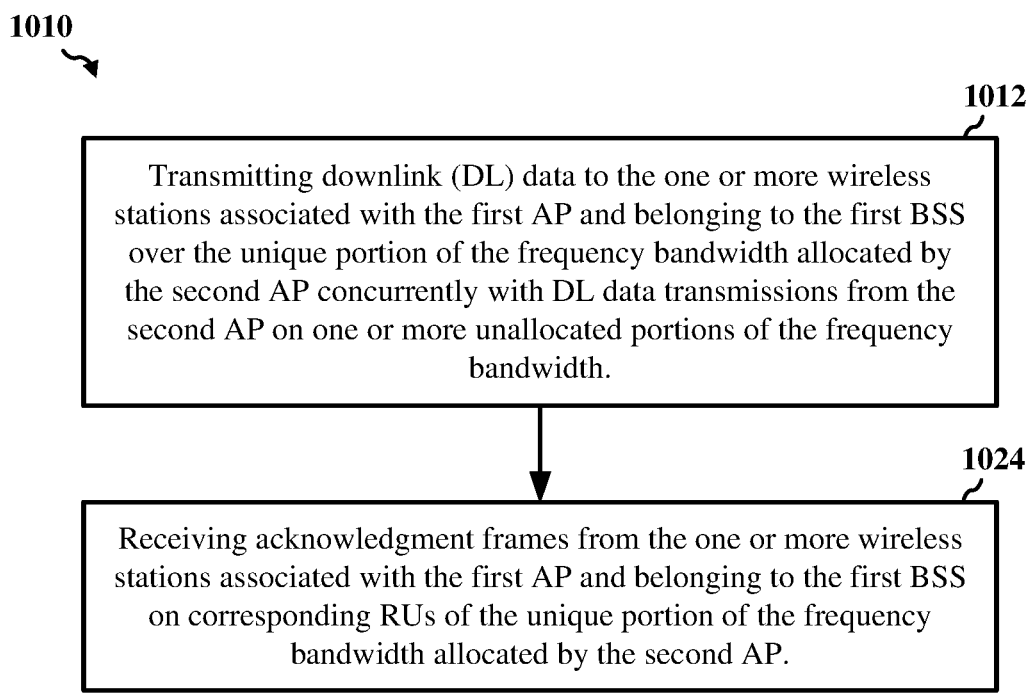
FIG. 10B shows a flowchart illustrating an example process for wireless communication according to some other implementations.

FIG. 10B shows a flowchart illustrating an example process 1010 for wireless communication according to some implementations. The process 1010 may be performed by a wireless communication device such as the wireless communication device 500 described above with reference to FIG. 5. In some implementations, the process 1010 be performed by a wireless communication device operating as or within an AP, such as one of the APs 102 and 602 described above with reference to FIGS. 1 and 6A, respectively. With reference to FIG. 9, in some implementations, the process 1010 may be another example of transmitting or receiving the one or more wireless packets to or from the one or more wireless stations associated with the first AP in block 908 of the process 900, and begins in block 1012 with transmitting downlink (DL) data to the one or more wireless stations associated with the first AP and belonging to the first BSS over the unique portion of the frequency bandwidth allocated by the second AP concurrently with DL data transmissions from the second AP on one or more unallocated portions of the frequency bandwidth. In block 1014, the process proceeds with receiving acknowledgment frames from the one or more wireless stations associated with the first AP and belonging to the first BSS on corresponding RUs of the unique portion of the frequency bandwidth allocated by the second AP.

FIG. 10C shows a flowchart illustrating an example process 1020 for wireless communication according to some implementations. The process 1020 may be performed by a wireless communication device such as the wireless communication device 500 described above with reference to FIG. 5. In some implementations, the process 1020 may be performed by a wireless communication device operating as or within an AP, such as one of the APs 102 and 602 described above with reference to FIGS. 1 and 6A, respectively. With reference to FIG. 9, in some implementations, the process 1020 may be an example of receiving the first control information in block 904 of the process 900, and begins in block 1022 with receiving a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP.

In some implementations, the first control information further includes one or more of a duration of the TXOP, a maximum number of spatial streams to be used for transmissions during the TXOP, a maximum number of wireless stations for each of the first AP and the second AP for transmissions during the TXOP, a maximum packet duration for wireless packets transmitted during the TXOP, or a maximum transmit power level for transmitting wireless packets during the TXOP.

FIG. 10D shows a flowchart illustrating an example process 1030 for wireless communication according to some implementations. The process 1030 may be performed by a wireless communication device such as the wireless communication device 500 described above with reference to FIG. 5. In some implementations, the process 1030 may be performed by a wireless communication device operating as or within an AP, such as one of the APs 102 and 602 described above with reference to FIGS. 1 and 6A, respectively. With reference to FIG. 9, in some implementations, the process 1030 may be an example of transmitting the second control information in block 906 of the process 900, and begins in block 1032 with transmitting a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP.

In some implementations, the second control information further includes one or more of the size and location of the unique portion of the frequency bandwidth allocated by the second AP, a duration of the TXOP, a maximum number of spatial streams to be used for transmissions during the TXOP, a maximum number of wireless stations for each AP of the first AP and the second AP for transmissions during the TXOP, a maximum packet duration for wireless packets transmitted during the TXOP, or a maximum transmit power level for transmitting wireless packets during the TXOP.

Figure 11:
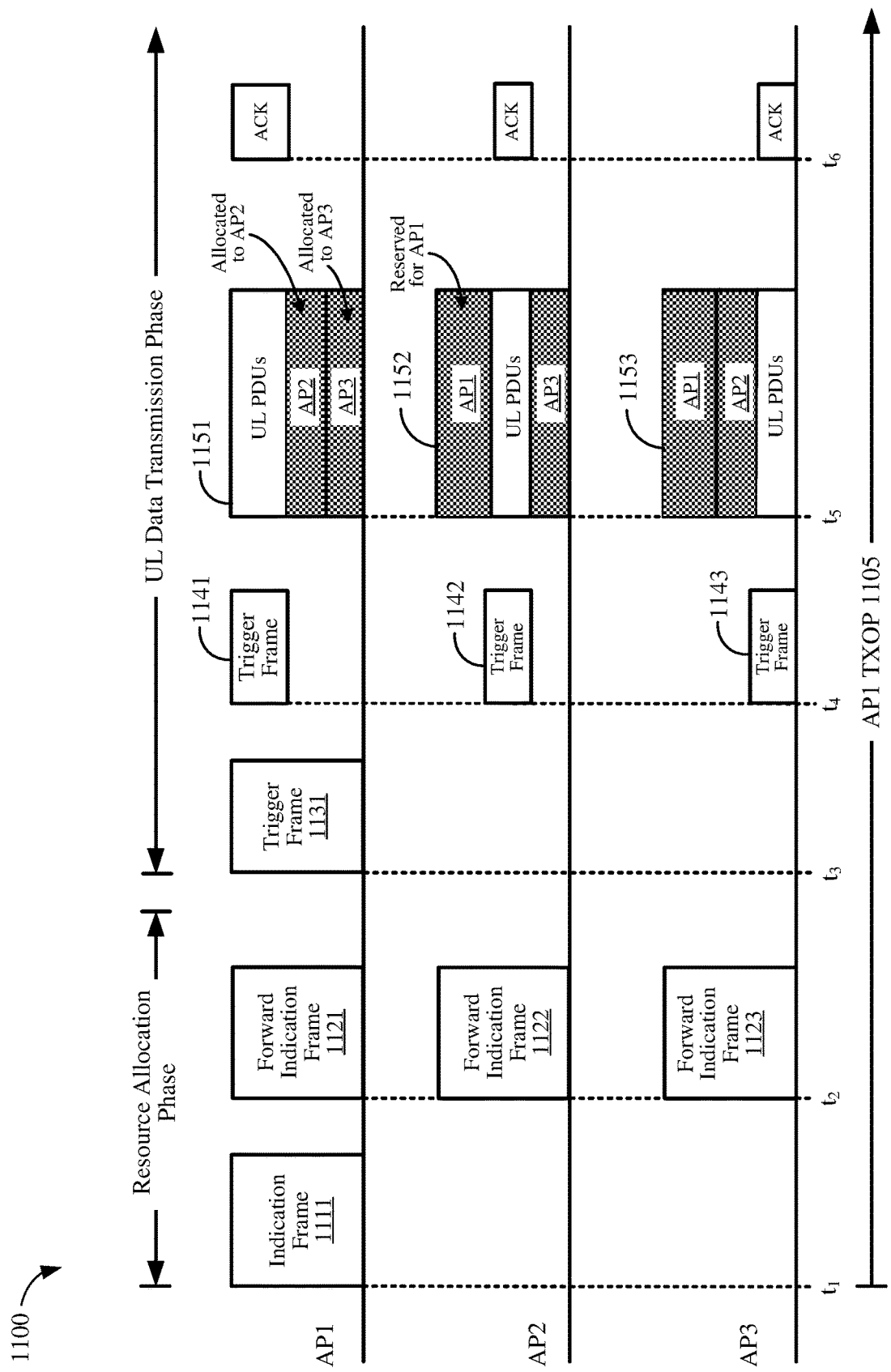
FIG. 11 shows a timing diagram illustrating the transmissions of communications in one example of the processes of one or more of FIGS. 7, 8A, 8B, 8C, 8D, 9, 10A, 10B, 10C, or 10D.

FIG. 11 shows a timing diagram 1100 illustrating the transmissions of communications in one example of the processes of FIGS. 7, 8A, 8B, 8C, 8D, 9, 10A, 10B, 10C, and 10D. In some implementations, the communications may be exchanged between a first access point (AP1), a second access point (AP2), and a third access point (AP3). Each of the access points AP1, AP2 and AP3 may be any suitable wireless communication device such as one of the APs 102 and 602 described above with reference to FIGS. 1 and 6A, respectively. Although the example timing diagram 1100 shows three access points AP1, AP2 and AP3, implementations of the subject matter disclosed herein may be used with any suitable number of access points (or other wireless devices). Thus, the example operation for concurrent UL transmissions during a coordinated access point transmission session described with reference to FIG. 11 may include other numbers of participating APs.

Prior to time $t_1$, AP1 obtains a TXOP 1105 for transmissions over a wireless medium using a frequency bandwidth. AP1 may obtain the TXOP 1105 by contending with other wireless devices (such as AP2 and AP3) for access to a wireless medium associated with the frequency bandwidth. In some implementations, AP1 and the other wireless devices may contend for medium access using a Distributed Coordination Function (DCF). As described above, the DCF may be implemented through the use of CSMA/CA and timing intervals (such as SIFS, DIFS, EIFS, and AIFS). For example, AP1 senses the wireless medium, and after the wireless medium remains idle for the appropriate IFS (for example, the DIFS), AP1 begins to decrement its back-off counter from a randomly selected value between 0 and CW, where CW is a contention window size. Other contending wireless devices such as AP2 and AP3 follow a similar procedure and randomly select initial values for their own back-off counters. Each of the access points AP1, AP2 and AP3 (and other contending wireless devices) decrements its back-off counter by one slot each time the medium is sensed to be idle during a corresponding slot interval. For the example of FIG. 11, AP1 selected the lowest back-off value such that its back-off counter reaches zero before the back-off counters associated with AP2 and AP3, and thus AP1 wins access to the wireless medium and obtains (and becomes the owner of) the TXOP 1105.

AP1 may select one or more other APs for participation in a coordinated access point transmission (CAP TX) session on a wireless medium. For the example of FIG. 11, AP1 selects AP2 and AP3 to participate in the coordinated access point transmission session. In some implementations, AP1 may belong to or control a first basic service set (BSS), AP2 may belong to or control a second BSS, and AP3 may belong to or control a third BSS. Although not shown in FIG. 11 for simplicity, one or more first wireless stations may be associated with AP1 and belong to the first BSS, one or more second wireless stations may be associated with AP2 and belong to the second BSS, and one or more third wireless stations may be associated with AP3 and belong to the third BSS.

AP1 may allocate, to each of the selected APs, a unique portion of a frequency bandwidth of the wireless medium for data transmissions during the TXOP 1105 obtained by the first AP. In some implementations, the unique portions of the frequency bandwidth allocated by AP1 may be one of 20 MHz channel, a 40 MHz channel, an 80 MHz channel, or a 160 MHz channel. For the example of FIG. 11, AP1 allocates one unique 20 MHz channel to AP2, allocates another unique 20 MHz channel to AP3, and reserves a unique 40 MHz channel for itself.

The time period between time $t_1$ and time $t_3$ may correspond to a resource allocation phase of the coordinated access point transmission session. At time $t_1$, AP1 transmits control information carried in an indication frame 1111 to AP2 and AP3 (and other APs that are participating in the coordinated access point transmission session). The control information may include a size and location of the 20 MHz channel allocated to AP2, may include a size and location of the 20 MHz channel allocated to AP3, and may include a size and location of the 40 MHz channel reserved for AP1. In some implementations, the control information may also include one or more of a duration of the TXOP, a maximum number of spatial streams to be used for transmissions during the TXOP, a maximum number of wireless stations for each of the selected APs for transmissions during the TXOP, a maximum packet duration for wireless packets transmitted during the TXOP, or a maximum transmit power level for transmitting wireless packets during the TXOP. In some aspects, the indication frame 1111 may contain a bitmap indicating the sizes and locations of one or more unique portions of the frequency bandwidth allocated by AP1 to one or more APs participating in the coordinated access point transmission session (such as AP2 and AP3).

In some implementations, the control information may be carried in a Common Info field (or any other suitable field) of the indication frame 1111. In addition, or in the alternative, the indication frame 1111 may include one or more BSS Info fields, each for storing transmission information for a corresponding BSS. The spectral mask used in coordinated access point transmission sessions by each of the participating APs may be the mask corresponding to the total channel bandwidth available to the AP TXOP owner (such as 80 MHz for the example discussed above with reference to FIGS. 11 and 12). The spectral mask used in the resource allocation phase of a coordinated access point transmission session may also be used in the data transmission phase of the coordinated access point transmission session.

In some implementations, the control information carried in the indication frame 1111 may indicate whether the coordinated access point transmission session is designated for uplink (UL) transmissions or downlink (DL) transmissions. The control information carried in the indication frame 1111 may also indicate whether AP1 is to transmit, prior to the UL or DL transmissions, a frame from which one or more wireless stations may measure a received power of AP1 relative to the respective wireless station. In some implementations, the frame may be a trigger frame soliciting power measurements from wireless stations associated with AP1, wireless stations associated with AP2, wireless stations associated with AP3, or any combination thereof.

The indication frame 1111 may be any suitable management or control frame. In some implementations, the indication frame 1111 may be a high-efficiency (HE) or an extremely high-throughput (EHT) trigger frame variant transmitted from AP1 in a non-HT duplicate format on each 20 MHz channel of the frequency bandwidth. For the example of FIG. 11, AP1 may transmit the HE or EHT trigger frame variant as a plurality of non-HT duplicates (each containing the indication frame 1111) on the 20 MHz channel allocated to AP2, on the 20 MHz channel allocated to AP3, and on each of the 20 MHz channels reserved for AP1. Transmitting the indication frame 1111 as a plurality of non-HT duplicates on each channel of the frequency bandwidth may ensure that each of the participating APs (such as AP2 and AP3) receives the indication frame 1111, irrespective of the particular channels upon which AP2 and AP3 normally operate.

Between times $t_1$ and $t_2$, AP2 and AP3 each receive the control information carried in the indication frame 1111 transmitted from AP1. In response thereto, AP2 transmits the control information in a forward indication frame 1122 to one or more of its associated wireless stations, and AP3 transmits the control information in a forward indication frame 1123 to one or more of its associated wireless stations. In some implementations, AP1 may also transmit the control information in a forward indication frame 1121 to one or more wireless stations associated with AP1 and belonging to the first BSS.

The forward indication frames 1121, 1122, and 1123 may include the same information as (or may be a copy of) the indication frame 1111. For example, the forward indication frame 1122 may indicate at least the size and location of the portion of the frequency bandwidth allocated to AP2, and the forward indication frame 1123 may indicate at least the size and location of the portion of the frequency bandwidth allocated to AP3. The forward indication frames 1121, 1122, and 1123 may also include some or all of the transmission information contained in the indication frame 1111. In addition, or in the alternative, the forward indication frames 1121, 1122, and 1123 may indicate whether the coordinated access point transmission session is designated for UL transmissions or DL transmissions, and may indicate whether AP1 is to transmit, prior to transmitting or receiving the one or more wireless packets, a trigger frame from which wireless stations associated with one or more of AP1, AP2, or AP3 generate a power measurement.

In some implementations, the forward indication frame 1121 may be transmitted as an HE or EHT trigger frame variant only on the portion of the frequency bandwidth reserved for AP1, the forward indication frame 1122 may be transmitted as an HE or EHT trigger frame variant only on the portion of the frequency bandwidth allocated to AP2, and the forward indication frame 1123 may be transmitted as an HE or EHT trigger frame variant only on the portion of the frequency bandwidth allocated to AP3. By transmitting forward indication frames 1121, 1122, and 1123 only using the respective portions of frequency bandwidth allocated to AP1, AP2, and AP3, respectively, interference between forward indication frames 1121, 1122, and 1123, as well as interference with AP1 transmissions caused by forward indication frames 1122 and 1123, may be reduced, for example, compared with implementations in which the forward indication frames 1121, 1122, and 1123 are each transmitted over the entire frequency bandwidth associated with the TXOP 1105.

Although the forward indication frames 1121, 1122, and 1123 may be transmitted as non-HT duplicates (such as by forwarding the indication frame 1111 rather than constructing a new forward indication frame), wireless stations associated with one of AP1, AP2, and AP3 may receive all of the forward indication frames 1121, 1122, and 1123, concurrently, and may not be able to decode the corresponding one of the forward indication frames 1121, 1122, and 1123 due to interference caused by others of the forward indication frames 1121, 1122, and 1123. Moreover, the guard interval associated with non-HT duplicates is 400 ns, which may not be sufficient to align the symbol boundaries of the forward indication frames 1121, 1122, and 1123. By transmitting the forward indication frames 1121, 1122, and 1123 as either HE or EHT trigger frame variants only on corresponding portions of the frequency bandwidth, wireless stations associated with a particular one of AP1, AP2, and AP3 may receive only the corresponding one of the forward indication frames 1121, 1122, and 1123. Moreover, frames formatted according to HE and EHT protocols may have guard intervals greater than 400 ns, which may be sufficient to align the symbol boundaries of the forward indication frames 1121, 1122, and 1123 and thereby minimize interference.

The forward indication frames 1121, 1122, and 1123 are identical to each other (such as having the same format, having the same transmit durations, and containing the same information) and are transmitted at the same time (such as concurrently). In this manner, if two or more of AP1, AP2, and AP3 both operate on the same primary channel, then transmission of the forward indication frames 1121, 1122, and 1123 may have little (if any) interference with each other. In addition, by constructing the forward indication frames 1122 and 1123 to have the same (or at least similar) waveforms and to contain the same resource allocation information, nearby wireless devices may receive and decode any one of the forward indication frames 1122 and 1123 to determine the size and location of the frequency bandwidth portions allocated to each of AP2 and AP3.

In some implementations, the frequency bandwidth allocated to AP2 by AP1 may be different than the primary channel used by AP2, the frequency bandwidth allocated to AP3 by AP1 may be different than the primary channel used by AP3, or both. In such implementations, the forward indication frames 1122 and 1123 may inform wireless stations associated with AP2 and AP3 as to the particular channel or frequency bandwidth upon which wireless stations associated with AP2 and AP3 are to transmit UL data during the coordinated access point transmission session. Similarly, the forward indication frame 1121 may inform wireless stations associated with AP1 as to the particular channel or frequency bandwidth upon which wireless stations associated with AP1 are to transmit UL data during the coordinated access point transmission session.

The time period beginning at time $t_3$ may correspond to an UL data transmission phase of the coordinated access point transmission session. At time $t_3$, AP1 transmits a trigger frame 1131 on the full frequency bandwidth associated with the TXOP 1105. The trigger frame 1131 may be used by each of AP2 and AP3 to synchronize UL OFDMA transmissions (in both time and frequency) from their respective wireless stations. In some implementations, the trigger frame 1131 may be used by wireless stations associated one or more of AP1, AP2, and AP3 to measure the received power of the trigger frame 1131. In some implementations, the trigger frame 1131 may be a shortened trigger frame (such as a trigger frame including less than all of the fields provided by the IEEE 802.11 family of standards). In other implementations, any other suitable type of frame from which AP2 and AP3 may synchronize UL OFDMA transmissions or from which the wireless stations can measure a receive power level may be used as the trigger frame 1131.

The wireless stations associated with AP1, AP2, and AP3 may measure the receive power of the trigger frame 1131, and may use the measured receive power to determine or adjust their own power settings when transmitting UL to their associated APs during the TXOP 1105. In some implementations, each wireless station may determine the maximum transmit power which ensures that interference between all of the concurrent transmissions heard by AP1 are below a level. For example, the received power of the trigger frame 1131 at a given wireless station may be expressed as:

$$PWR_{RX\_STA} = PWR_{TX\_AP} - PL,$$

where $PWR_{TX\_AP}$ is the transmit power of AP1 and PL is the path loss on the channel between the given wireless station and AP1. The received power at AP1 with respect to the given wireless station may be expressed as:

$$PWR_{RX\_AP} = PWR_{TX\_STA} - PL,$$

where $PWR_{TX\_STA}$ is the transmit power of the given wireless station and PL is the path loss on the channel between the given wireless station and AP1. Also, because $PWR_{RX\_AP} + PWR_{TX\_AP} = PWR_{RX\_STA} + PWR_{TX\_STA}$, the above equations may be rearranged to express the maximum transmit power for the given wireless station as:

$$X = PWR_{RX\_AP} + PWR_{TX\_AP}.$$

By controlling the transmit power of wireless stations for UL transmissions during the TXOP 1105, implementations of the subject matter disclosed herein may ensure that the combined transmit power of UL transmissions to each of AP2 and AP3 causes minimal interference (such as less than a value) with UL transmissions to AP1. In some implementations, AP1 may advertise the value of X, for example, by transmitting any suitable management frame or control frame that includes the maximum transmit power to be used by wireless stations during the coordinated access point transmission session.

At time $t_4$, AP1 may transmit a trigger frame 1141 soliciting UL transmissions from one or more wireless stations associated with AP1 and belonging to the first BSS, AP2 may transmit a trigger frame 1142 soliciting UL transmissions from one or more wireless stations associated with AP2 and belonging to the second BSS, and AP3 may transmit a trigger frame 1143 soliciting UL transmissions from one or more wireless stations associated with AP3 and belonging to the third BSS, concurrently. In some implementations, AP1 may transmit the trigger frame 1141 only on the reserved portion of the frequency bandwidth, AP2 may transmit the trigger frame 1142 only on the portion of the frequency bandwidth reserved allocated thereto by AP1, and AP3 may transmit the trigger frame 1143 only on the portion of the frequency bandwidth reserved allocated thereto by AP1.

Each of the trigger frames 1141, 1142, and 1143 may be any suitable trigger frame compliant with one or more of the IEEE 802.11 family of standards. In some implementations, each of the trigger frames 1141, 1142, and 1143 may identify one or more wireless stations associated with AP1, AP2, and AP3, respectively, for UL transmissions, and may allocate a unique resource unit (RU) to each of the identified wireless stations associated with AP1, AP2, and AP3, respectively, for UL transmissions. For example, the trigger frame 1141 may identify one or more wireless stations associated with AP1 for UL transmissions, and may allocate a unique RU within the reserved portion of the frequency bandwidth to each of the identified wireless stations. The trigger frame 1142 may identify one or more wireless stations associated with AP2 for UL transmissions, and may allocate a unique RU within the portion of the frequency bandwidth allocated to AP2 to each of the identified wireless stations. The trigger frame 1143 may identify one or more wireless stations associated with AP3 for UL transmissions, and may allocate a unique RU within the portion of the frequency bandwidth allocated to AP3 to each of the identified wireless stations. In one or more implementations, the trigger frame 1125 may also include the TXOP duration, the number of spatial streams to be used by the wireless stations for UL transmissions, and other suitable information pertaining to the concurrent transmission of UL data to AP1, AP2, and AP3 during the TXOP 1105.

In some implementations, each of the trigger frames 1141, 1142, and 1143 1125 may include synchronization information that can be used to temporally align one or more symbol boundaries of protocol data units to be transmitted to respective access points AP1, AP2, and AP3 with each other. In some implementations, the symbol boundaries may correspond to at least one of a HE-SIG-B field, an HE-LTF field, or an end of a particular protocol data unit. In other implementations, other symbol boundaries of transmitted protocol data units may be used to temporally align UL transmissions to AP1, AP2 and AP3.

At time $t_5$, one or more wireless stations associated with AP1 and belonging to the first BSS transmit UL protocol data unit (UL PDUs) 1151 on the portion of the frequency bandwidth reserved for AP1, one or more wireless stations associated with AP2 and belonging to the second BSS transmit UL PDUs 1152 on the portion of the frequency bandwidth allocated to AP2, and one or more wireless stations associated with AP3 and belonging to the third BSS transmit UL PDUs 1153 on the portion of the frequency bandwidth allocated to AP3, concurrently. Using an above example in which the frequency bandwidth associated with the coordinated access point transmission session is 80 MHz, wireless stations associated with AP1 may transmit UL PDUs 1151 using the reserved 40 MHz channel, wireless stations associated with AP2 may transmit UL PDUs 1152 using the 20 MHz channel allocated to AP2 by AP1, and wireless stations associated with AP3 may transmit UL PDUs 1153 using the 20 MHz channel allocated to AP3 by AP1. In some implementations, the PDUs 1151 may be transmitted to AP1 as EHT or HE trigger-based (TB) PPDUs, the PDUs 1152 may be transmitted to AP2 as EHT or HE TB PPDUs, and the PDUs 1153 may be transmitted to AP3 as EHT or HE TB PPDUs. In addition, or in the alternative, the wireless stations associated with a respective one of AP1, AP2, and AP3 may transmit their corresponding TB PPDUs using MU OFDMA. In some implementations, transmissions of the UL PDUs to AP1, AP2, and AP3 may also end at the same time (or at least at substantially the same time).

Between times $t_5$ and $t_6$, AP1 receives the UL PDUs 1151 transmitted from the one or more wireless stations associated with AP1 and belonging to the first BSS, AP2 receives the UL PDUs 1152 transmitted from the one or more wireless stations associated with AP2 and belonging to the second BSS, and AP3 receives the UL PDUs 1153 transmitted from the one or more wireless stations associated with AP3 and belonging to the third BSS. In response thereto, each of AP1, AP2, and AP3 may transmit an acknowledgement (ACK) frame at time $t_6$, for example, to acknowledge reception of the corresponding UL PDUs.

Although only one UL transmission is shown in the example of FIG. 11, the coordinated access point transmission session may include any suitable number of UL transmissions to AP1, AP2 and AP3 that temporally fit within the TXOP duration 1105.

Figure 12:
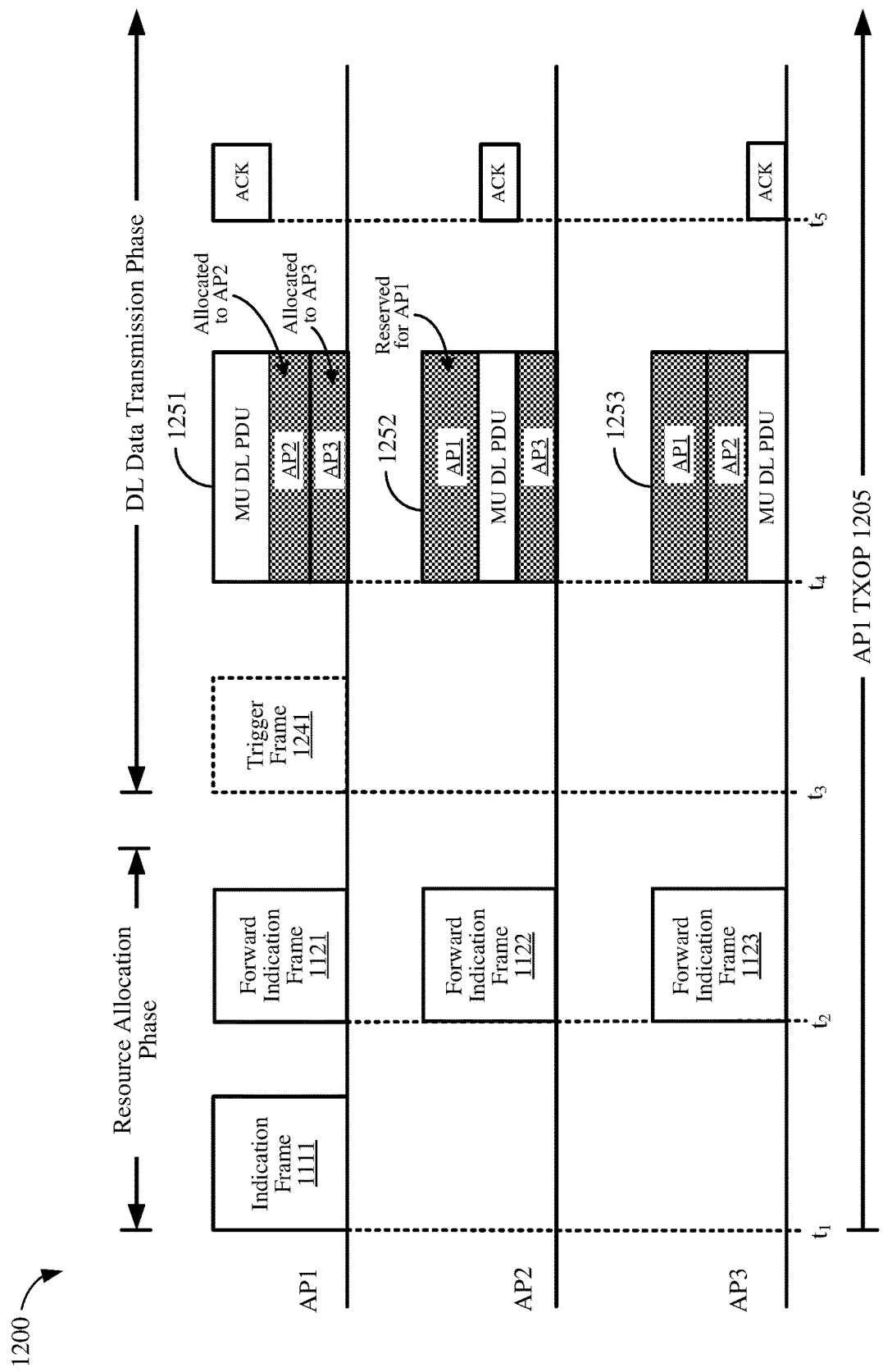
FIG. 12 shows a timing diagram illustrating the transmissions of communications in another example of the processes of one or more of FIGS. 7, 8A, 8B, 8C, 8D, 9, 10A, 10B, 10C, or 10D.

FIG. 12 shows a timing diagram 1200 illustrating the transmissions of communications in another example of the processes of FIGS. 7, 8A, 8B, 8C, 8D, 9, 10A, 10B, 10C, and 10D. In some implementations, the communications may be exchanged between AP1, AP2, and AP3 described with reference to FIG. 11. Although the example timing diagram 1200 shows three access points AP1, AP2 and AP3, implementations of the subject matter disclosed herein may be used with any suitable number of access points (or other wireless devices). Thus, the example operation for concurrent DL transmissions during the coordinated access point transmission session described with reference to FIG. 12 may include other numbers of participating APs.

As described with reference to FIG. 11, AP1 obtains a TXOP 1205 for transmissions over the wireless medium prior to time $t_1$, selects AP2 and AP3 to participate in the coordinated access point transmission session, and allocates each of AP2 and AP3 a unique portion of the frequency bandwidth for concurrent transmissions during the TXOP 1205. For the example of FIG. 12, AP1 allocates a unique 20 MHz channel to AP2, allocates another unique 20 MHz channel to AP3, and reserves a unique 40 MHz for itself.

In some implementations, the time period between time $t_1$ and time $t_5$ may correspond to the resource allocation phase of the coordinated access point transmission session. For example, during the resource allocation phase, AP1 may transmit an indication frame 1111 containing resource allocation and transmission information. Each of AP2 and AP3 may receive the indication frame 1111, and may transmit respective forward indication frames 1122 and 1123 to their associated wireless stations. In some implementations, AP1 may transmit forward indication frame 1121 to its associated wireless stations.

The period of time beginning at time $t_5$ may correspond to a DL data transmission phase of the coordinated access point transmission session. In some implementations, at time $t_5$, AP1 may transmit a trigger frame 1241 containing synchronizing information that may be used to temporally align DL transmissions from each of AP1, AP2, and AP3. For example, the synchronization information may be used by each of AP2 and AP3 to temporally align a number of symbol boundaries of protocol data units to be transmitted from AP2 and AP3 with each other and with corresponding symbol boundaries of protocol data units to be transmitted from AP1. The symbol boundaries may correspond to at least one of a HE-SIG-B field, an HE-LTF field, or an end of the protocol data unit. In one or more implementations, the trigger frame 1241 may also include one or more of a duration of the TXOP 1205, a maximum number of spatial streams to be used for transmissions during the TXOP 1205, a maximum number of wireless stations for each of the first AP and the second AP for transmissions during the TXOP 1205, a maximum packet duration for wireless packets transmitted during the TXOP 1205, or a maximum transmit power level for transmitting wireless packets during the TXOP 1205. In other implementations, AP1 may not transmit the trigger frame 1241.

At time $t_4$, AP1 transmits MU DL PDU 1251 on the reserved portion of the frequency bandwidth, AP2 transmits MU DL PDU 1252 on the unique portion of the frequency bandwidth allocated by AP1, and AP3 transmits MU DL PDU 1253 on the unique portion of the frequency bandwidth allocated by AP1, concurrently. Using the above example in which the frequency bandwidth associated with the coordinated access point transmission session is 80 MHz, AP1 may transmit MU DL PDU 1251 using the reserved 40 MHz channel, AP2 may transmit MU DL PDU 1252 using its allocated 20 MHz channel, and AP3 may transmit MU DL PDU 1253 using its allocated 20 MHz channel.

In some implementations, AP1 may transmit MU DL PDU 1251 using either the EHT or HE format, AP2 may transmit MU DL PDU 1252 using either the EHT or HE format, and AP3 may transmit MU DL PDU 1253 using either the EHT or HE format. In addition, or in the alternative, AP1, AP2, and AP3 may transmit their corresponding MU DL PDUs using MU OFDMA. In some implementations, the DL transmissions from each of AP1, AP2, and AP3 also ends at the same time (or at least at substantially the same time).

Between times $t_4$ and $t_5$, one or more wireless stations associated with AP1 and belonging to the first BSS receive the MU DL PDUs 1251 transmitted from AP1 on one or more corresponding RUs located within the reserved portion of the frequency bandwidth, one or more wireless stations associated with AP2 and belonging to the second BSS receive the MU DL PDUs 1252 transmitted from AP2 on one or more corresponding RUs located within the frequency portion allocated to AP2, and one or more wireless stations associated with AP3 and belonging to the third BSS receive the MU DL PDUs 1253 transmitted from AP3 on one or more corresponding RUs located within the frequency portion allocated to AP3, concurrently. At time $t_5$, each of AP1, AP2, and AP3 may receive one or more ACK frames from their one or more associated wireless stations (such as to confirm reception of the DL data).

Although only one DL transmission is shown in FIG. 12, the TXOP 1205 may include any suitable number of DL transmissions from AP1, AP2 and AP3 that temporally fit within the TXOP duration 1205.

Figure 13A:
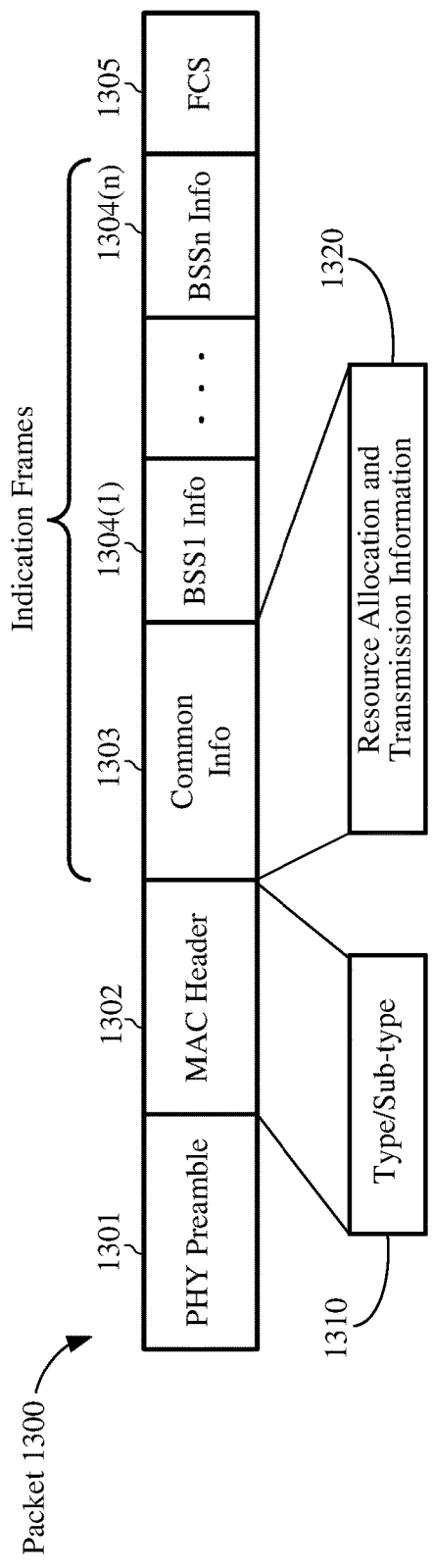
FIG. 13A shows an example packet according to some implementations.

FIG. 13A shows an example packet 1300 according to some implementations. The packet 1300 may be used to transmit one or more of the indication frames of FIG. 11 or 12. In some implementations, the packet 1300 may be a non-HT duplicate PPDU carrying a plurality of identical or duplicate indication frames (such as the indication frames 1111 of FIGS. 11 and 12) each transmitted on a corresponding 20 MHz channel of the frequency bandwidth. For example, if the frequency bandwidth associated with a coordinated access point transmission session is 80 MHz, then the packet 1300 may carry four 20 MHz non-HT duplicates.

The packet 1300 is shown to include a PHY preamble 1301, a MAC header 1302, a Common Info field 1303, a plurality of BSS fields 1304(1)-1304(n), and a frame check sequence (FCS) field 1305. The PHY preamble 1301 may include a legacy preamble portion and a non-legacy preamble portion (not shown for simplicity). The legacy preamble portion, which may be one example of the legacy preamble portion 322 of FIG. 3B, includes an L-STF, an L-LTF, and an L-SIG field. In some implementations, the non-legacy preamble portion may be one example of the HE preamble 324 of FIG. 3B. In other implementations, the non-legacy preamble portion may be an EHT preamble.

The MAC header 1302 may include a frame control field, a duration field, a receiver address (RA) field, and a transmitter address (TA) field. The frame control field may include type and sub-type fields 1310 that can be set to an identifier value indicating that the packet 1300 contains one or more indication frames formatted as an HE or EHT trigger frame variant and transmitted as non-HT duplicates.

The Common Info field 1303 may store information common to one or more APs participating in a coordinated access point transmission session. In some implementations, the Common Info field 1303 may store resource allocation and transmission information 1320 pertaining to the coordinated access point transmission session. In some aspects, the resource allocation and transmission information 1320 may include one or more of the sizes and locations of the unique portions of the frequency bandwidth allocated by the first AP, a duration of a TXOP associated with the coordinated access point transmission session, a maximum number of spatial streams to be used for transmissions during the TXOP, a maximum number of wireless stations for each of the APs participating in the coordinated access point transmission session, a maximum packet duration for transmissions during the TXOP, a guard interval, the number of LTFs in wireless packets to be transmitted during the coordinated access point transmission session, an indication of whether the coordinated access point transmission session or the TXOP is designated for UL transmissions or DL transmissions, an indication of whether the AP that obtained the TXOP is to transmit a trigger frame from which wireless stations can measure a power level, or a maximum transmit power level for transmissions in each of the BSSs during the TXOP. Each of the BSS fields 1304(1)-1304(n) may store information for the BSS of a corresponding one of the participating APs. The FCS field 1305 may store a frame check sequence (such as for error detection).

Figure 13B:
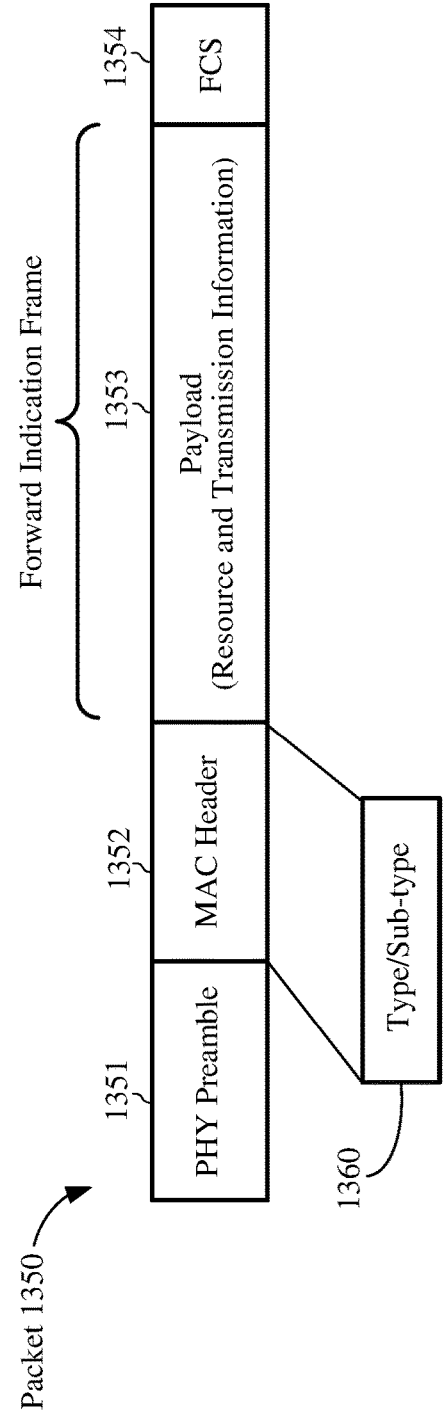
FIG. 13B shows another example packet according to some implementations.

FIG. 13B shows another example packet 1350 according to some implementations. The packet 1350 may be used by an AP participating in a coordinated access point transmission session to transmit a forward indication frame (such as one of the forward indication frames 1121-1123 of FIGS. 11 and 12) to one or more associated wireless stations. In some implementations, the packet 1350 may be an EHT or HE MU PPDU carrying forward indication frames formatted for transmission on different 20 MHz channels of the frequency bandwidth associated with a coordinated access point transmission session.

The packet 1350 is shown to include a PHY preamble 1351, a MAC header 1352, a payload 1353, and an FCS field 1355. The PHY preamble 1351 may include a legacy preamble portion and a non-legacy preamble portion (not shown for simplicity). The legacy preamble portion, which may be one example of the legacy preamble portion 322 of FIG. 3B, includes an L-STF, an L-LTF, and an L-SIG field. The non-legacy preamble portion, which may be one example of the HE preamble 324 of FIG. 3B or may be an EHT preamble, includes an RL-SIG field, an HE-SIG-A field, an HE-SIG-B field, an HE STF, and one or more HE-LTFs. In some implementations, the HE-SIG-B field contains information mapping the participating APs of a coordinated access point transmission session to their allocated subchannels (such as BSSID to subchannel mapping or BSS Color to subchannel mapping).

The MAC header 1352 may include a frame control field, a duration field, an RA field, and a TA field. In some implementations, the packet 1350 may carry one or more forward indication frames formatted as trigger frames or trigger frame variants having a common address stored in the TA field of the MAC header 1352. The frame control field may include type and sub-type fields 1360 that can be set to an identifier value indicating that the packet 1350 is an EHT or HE PPDU containing a forward indication frame transmitted on a particular 20 MHz channel.

The payload 1353 may contain resource allocation and transmission information pertaining to the coordinated access point transmission session. In some implementations, the resource allocation and transmission information may include one or more of the sizes and locations of the unique portions of the frequency bandwidth allocated by the first AP, a duration of a TXOP associated with the coordinated access point transmission session, a maximum number of spatial streams to be used for transmissions during the TXOP, a maximum number of wireless stations for each of the APs participating in the coordinated access point transmission session, a maximum packet duration for transmissions during the TXOP, a guard interval, the number of LTFs in wireless packets to be transmitted during the coordinated access point transmission session, an indication of whether the coordinated access point transmission session or the TXOP is designated for UL transmissions or DL transmissions, an indication of whether the AP that obtained the TXOP is to transmit a trigger frame from which wireless stations can measure a power level, or a maximum transmit power level for transmissions in each of the BSSs during the TXOP.

The FCS field 1305 may store a frame check sequence (such as for error detection).

Referring also to FIG. 12, wireless stations associated with each of AP1, AP2, and AP3 may receive an HE MU PPDU carrying forward indication frames 1121-1123 and parse their respective Per BSS fields (since the BSS Color or AP ID of a particular AP is known by the wireless stations associated with the particular AP).

Figure 14:
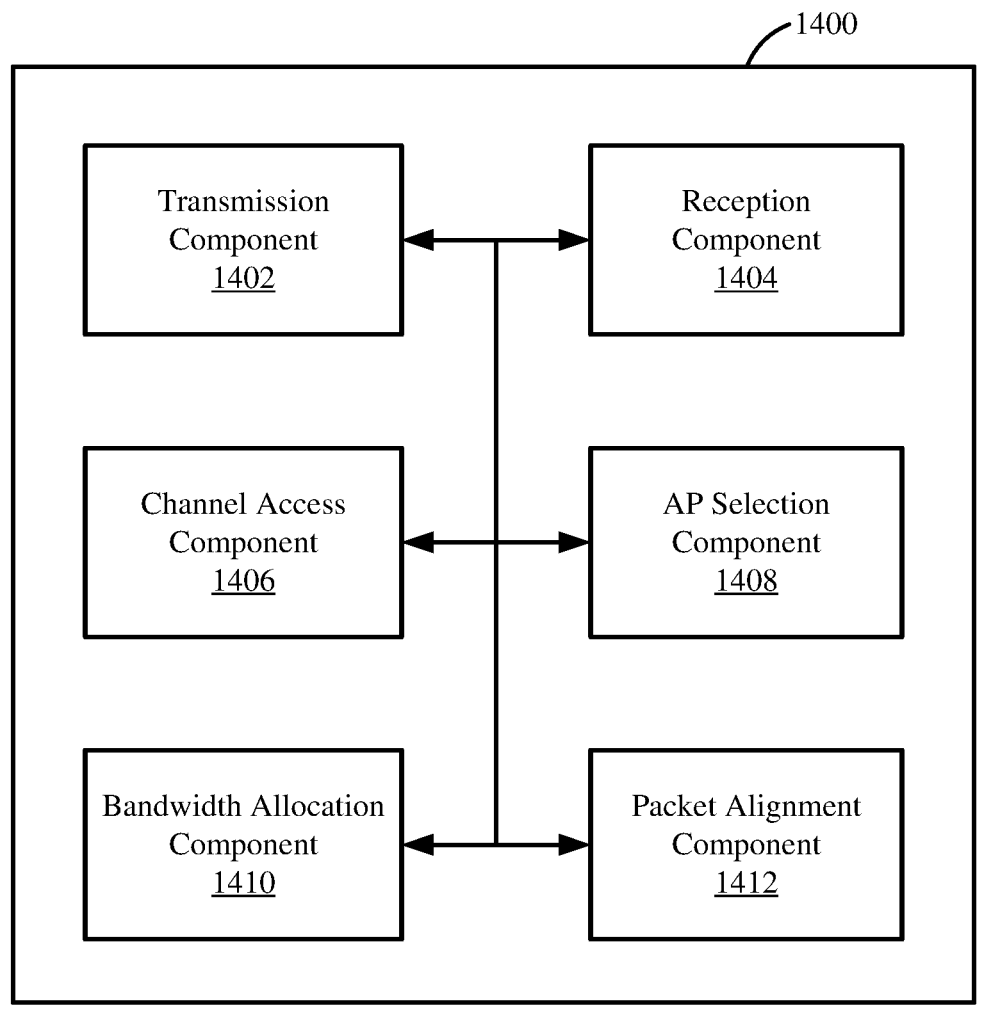
FIG. 14 shows a block diagram of an example wireless communication device according to some implementations.

FIG. 14 shows a block diagram of an example wireless communication device 1400 according to some implementations. In some implementations, the wireless communication device 1400 is configured to perform one or more of the processes 700, 800, 810, 820, 830, 900, 1000A, 1000B, 1000C, and 1000D described above with reference to FIGS. 7, 8A, 8B, 8C, 8D, 9, 10A, 10B, 10C, and 10D, respectively. The wireless communication device 1400 may be an example implementation of the wireless communication device 500 described above with reference to FIG. 5. For example, the wireless communication device 1400 can be a chip, SoC, chipset, package or device that includes at least one modem (for example, a Wi-Fi (IEEE 802.11) modem or a cellular modem such as the modem 502), at least one processor (such as the processor 504), at least one radio (such as the radio 506), and at least one memory (such as the memory 508). In some implementations, the wireless communication device 1400 can be a device for use in an AP, such as one of the APs 102 and 602 described above with reference to FIGS. 1 and 6A, respectively. In some other implementations, the wireless communication device 1400 can be an AP that includes such a chip, SoC, chipset, package or device as well as at least one transmitter, at least one receiver, and at least one antenna.

The wireless communication device 1400 includes a transmission component 1402, a reception component 1404, a channel access component 1406, an AP selection component 1408, a bandwidth allocation component 1410, and a packet alignment component 1412. Portions of one or more of the components 1402, 1404, 1406, 1408, 1410 and 1412 may be implemented at least in part in hardware or firmware. For example, the components 1402, 1404, 1406, 1408, 1410, and 1412 may be implemented at least in part by a modem (such as the modem 502). In some implementations, at least some of the components 1402, 1404, 1406, 1408, 1410 and 1412 are implemented at least in part as software stored in a memory (such as the memory 508). For example, portions of one or more of the components 1402, 1404, 1406, 1408, 1410 and 1412 can be implemented as non-transitory instructions (or "code") executable by a processor (such as the processor 506) to perform the functions or operations of the respective component.

The transmission component 1402 is configured to transmit control information to one or more other APs selected for participation in a coordinated access point transmission session on a wireless medium, and to transmit wireless packets, control information, trigger frames, and other wireless communications to wireless stations associated with the wireless communication device 1400.

The reception component 1404 is configured to receive wireless packets, acknowledgments, power measurements, and other wireless communications from the wireless stations associated with the wireless communication device 1400.

The channel access component 1406 is configured to content for medium access on the wireless medium. In some implementations, the channel access component 1406 may obtain a TXOP for transmitting wireless packets over a frequency bandwidth on the wireless medium.

The AP selection component 1408 is configured to select the other APs for participation in the coordinated access point transmission session.

The bandwidth allocation component 1410 is configured to allocate unique portions of the frequency bandwidth to each of the APs selected for participation in the coordinated access point transmission session. In some implementations, the bandwidth allocation component 1410 may also be configured to reserve an unallocated portion of the frequency bandwidth for transmissions to or from the wireless communication device 1400 during the TXOP.

The packet alignment component 1412 is configured to temporally align the one or more wireless packets transmitted or received by each of the selected APs to or from the wireless stations associated with the respective selected APs with the one or more wireless packets transmitted or received by the wireless communication device 1400 to or from the wireless stations associated with the wireless communication device 1400.

Figure 15:
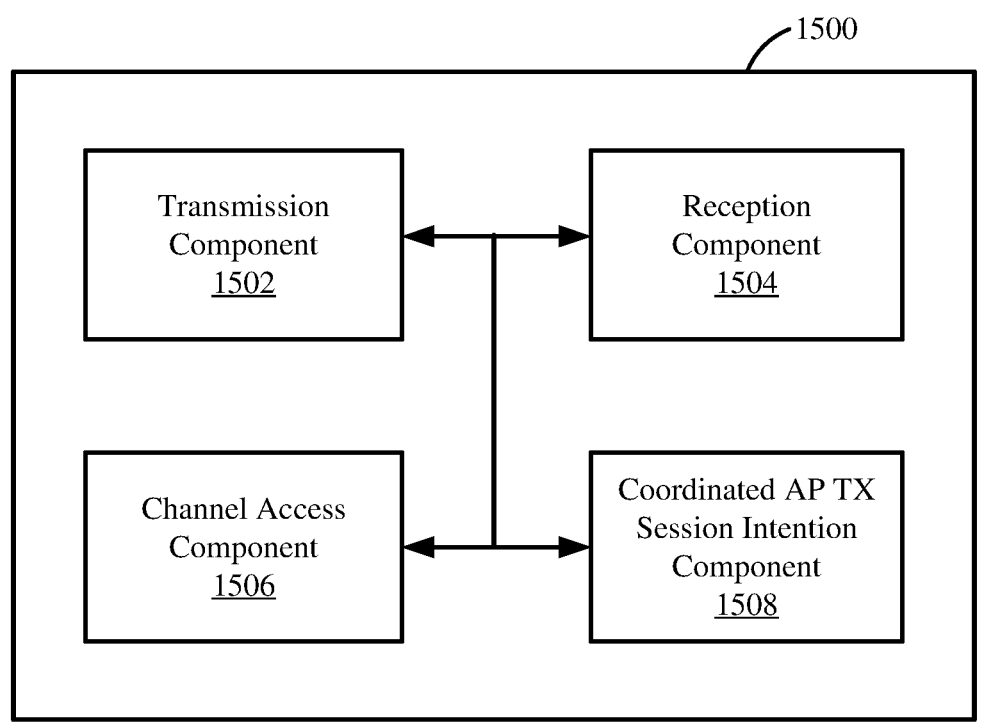
FIG. 15 shows a block diagram of another example wireless communication device according to some implementations.

FIG. 15 shows a block diagram of an example wireless communication device 1500 according to some implementations. In some implementations, the wireless communication device 1500 is configured to perform one or more of the processes 700, 800, 810, 820, 830, 900, 1000A, 1000B, 1000C, and 1000D described above with reference to FIGS. 7, 8A, 8B, 8C, 8D, 9, 10A, 10B, 10C, and 10D respectively. The wireless communication device 1500 may be an example implementation of the wireless communication device 500 described above with reference to FIG. 5. For example, the wireless communication device 1500 can be a chip, SoC, chipset, package or device that includes at least one modem (for example, a Wi-Fi (IEEE 802.11) modem or a cellular modem such as the modem 502), at least one processor (such as the processor 504), at least one radio (such as the radio 506), and at least one memory (such as the memory 508). In some implementations, the wireless communication device 1500 can be a device for use in an AP, such as one of the APs 102 and 602 described above with reference to FIGS. 1 and 6A, respectively. In some other implementations, the wireless communication device 1500 can be an AP that includes such a chip, SoC, chipset, package or device as well as at least one transmitter, at least one receiver, and at least one antenna.

The wireless communication device 1500 includes a transmission component 1502, a reception component 1504, a channel access component 1506, and a coordinated access point (AP) transmission (TX) session intention component 1508. Portions of one or more of the components 1502, 1504, 1506, and 1508 may be implemented at least in part in hardware or firmware. For example, the components 1502, 1504, 1506, and 1508 may be implemented at least in part by a modem (such as the modem 502). In some implementations, at least some of the components 1502, 1504, 1506, and 1508 are implemented at least in part as software stored in a memory (such as the memory 508). For example, portions of one or more of the components 1502, 1504, 1506, and 1508 can be implemented as non-transitory instructions (or "code") executable by a processor (such as the processor 506) to perform the functions or operations of the respective component.

The transmission component 1502 is configured to transmit an intent to participate in a coordinated access point transmission session to the second AP, and to transmit control information, wireless packets, trigger frames, and other wireless communications to wireless stations associated with the wireless communication device 1500.

The reception component 1504 is configured to receive control information from the second AP, and to receive wireless packets, acknowledgments, and other wireless communications from the wireless stations associated with the wireless communication device 1500.

The channel access component 1506 is configured to content for medium access and obtain a TXOP for transmitting wireless packets over a frequency bandwidth on the wireless medium.

The coordinated AP TX session intention component 1508 is configured to indicate an intent to participate in a coordinated access point transmission session on the wireless medium during a TXOP obtained by a second AP belonging to a second BSS.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a first wireless access point (AP), comprising:
    obtaining a transmit opportunity (TXOP) for transmitting wireless packets over a frequency bandwidth on a wireless medium;
    selecting one or more other APs for participation in a coordinated access point transmission session on the wireless medium;
    allocating, to each AP of the one or more selected APs, a unique portion of the frequency bandwidth for transmissions to or from the respective selected AP during the TXOP obtained by the first AP;
    reserving an unallocated portion of the frequency bandwidth for transmissions to or from the first AP during the TXOP;
    transmitting, to each of the one or more selected APs, control information indicating the unique portion of the frequency bandwidth allocated by the first AP to the respective selected AP;
    transmitting a frame to one or more wireless stations associated with the first AP, the frame including synchronization information for temporally aligning the one or more wireless packets transmitted or received by each of the selected APs to or from the wireless stations associated with the respective selected APs with the one or more wireless packets transmitted or received by the first AP to or from the wireless stations associated with the first AP; and
    transmitting or receiving one or more wireless packets to or from the one or more wireless stations associated with the first AP over the reserved portion of the frequency bandwidth concurrently with the transmission or reception of at least portions of one or more wireless packets by the selected APs to or from one or more wireless stations associated with the respective selected APs over the respective allocated portions of the frequency bandwidth.

2. The method of claim 1, wherein transmitting the control information comprises transmitting a non-legacy trigger frame variant that includes a plurality of legacy frame duplicates on a plurality of respective sub-channels of the frequency bandwidth, each legacy frame duplicate including a bitmap that includes indications of the unique portions of the frequency bandwidth allocated by the first AP to the respective selected APs.

3. The method of claim 1, wherein the control information further includes one or more of a duration of the TXOP, a maximum number of spatial streams to be used for transmissions during the TXOP, a maximum number of wireless stations for each of the selected APs for transmissions during the TXOP, a maximum packet duration for wireless packets transmitted during the TXOP, or a maximum transmit power level for transmitting wireless packets during the TXOP.

4. The method of claim 1, wherein the control information further indicates whether the coordinated access point transmission session is designated for uplink (UL) transmissions or downlink (DL) transmissions.

5. The method of claim 1, further comprising:
    receiving, from at least one of the wireless stations associated with the first AP or the one or more selected APs, a power measurement based on the transmitted frame.

6. The method of claim 1, wherein the frame solicits concurrent uplink (UL) transmissions over the reserved portion of the frequency bandwidth, the method further comprising:
    receiving, from the one or more wireless stations associated with the first AP, UL data transmitted on corresponding resource units (RUs) within the reserved portion of the frequency bandwidth.

7. The method of claim 6, wherein during the TXOP the first AP receives the UL data on the reserved portion of the frequency bandwidth concurrently with the reception of UL data by the one or more selected APs on their respective allocated portions of the frequency bandwidth.

8. The method of claim 1, wherein the transmitting or receiving of the one or more wireless packets to or from the one or more wireless stations associated with the first AP over the reserved portion of the frequency bandwidth comprises:
    transmitting downlink (DL) data on the reserved portion of the frequency bandwidth concurrently with DL data transmissions from the one or more selected APs on their respective allocated portions of the frequency bandwidth; and receiving, from the one or more wireless stations associated with the first AP, acknowledgement (ACK) frames on corresponding resource units (RUs) of the reserved portion of the frequency bandwidth.

9. The method of claim 1, wherein the control information is transmitted in the frame.

10. A method for wireless communication performed by a first wireless access point (AP) belonging to a first basic service set (BSS), comprising:

transmitting an intent to participate in a coordinated access point transmission session on a wireless medium during a transmit opportunity (TXOP) obtained by a second AP belonging to a second BSS;

receiving first control information indicating a unique portion of a frequency bandwidth allocated by the second AP for the transmission or reception of wireless packets by the first AP to or from wireless stations associated with the first AP and belonging to the first BSS during the TXOP;

transmitting, to one or more of the wireless stations associated with the first AP and belonging to the first BSS, second control information indicating the unique portion of the frequency bandwidth allocated by the second AP for the transmission or reception of wireless packets by the first AP to or from the wireless stations associated with the first AP and belonging to the first BSS; and transmitting or receiving one or more wireless packets to or from the one or more wireless stations associated with the first AP and belonging to the first BSS over the unique portion of the frequency bandwidth allocated by the second AP concurrently with the transmission or reception of at least portions of one or more wireless packets by the second AP to or from one or more wireless stations associated with the second AP and belonging to the second BSS over one or more unallocated portions of the frequency bandwidth.

11. The method of claim 10, wherein receiving the first control information comprises receiving a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP.

12. The method of claim 10, wherein the first control information further includes one or more of a duration of the TXOP, a maximum number of spatial streams to be used for transmissions during the TXOP, a maximum number of wireless stations for each of the first AP and the second AP for transmissions during the TXOP, a maximum packet duration for wireless packets transmitted during the TXOP, or a maximum transmit power level for transmitting wireless packets during the TXOP.

13. The method of claim 10, wherein transmitting the second control information comprises transmitting a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP.

14. The method of claim 10, wherein the second control information further includes one or more of the size and location of the unique portion of the frequency bandwidth allocated by the second AP, a duration of the TXOP, a maximum number of spatial streams to be used for transmissions during the TXOP, a maximum number of wireless stations for each AP of the first AP and the second AP for transmissions during the TXOP, a maximum packet duration for wireless packets transmitted during the TXOP, or a maximum transmit power level for transmitting wireless packets during the TXOP.

15. The method of claim 10, wherein the transmitting or receiving comprises:

transmitting a trigger frame allocating one or more unique resource units (RUs) within the allocated portion of the frequency bandwidth to each wireless station of the one or more wireless stations associated with the first AP and belonging to the first BSS; and receiving uplink (UL) data from the one or more wireless stations associated with the first AP and belonging to the first BSS on the respective RUs allocated by the first AP.

16. The method of claim 10, wherein the transmitting or receiving comprises:

transmitting downlink (DL) data to the one or more wireless stations associated with the first AP and belonging to the first BSS over the unique portion of the frequency bandwidth allocated by the second AP concurrently with DL data transmissions from the second AP on one or more unallocated portions of the frequency bandwidth; and receiving acknowledgment frames from the one or more wireless stations associated with the first AP and belonging to the first BSS on corresponding resource units (RUs) of the unique portion of the frequency bandwidth allocated by the second AP.

17. A first wireless access point (AP), comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

obtain a transmit opportunity (TXOP) for transmitting wireless packets over a frequency bandwidth on a wireless medium;

select one or more other APs for participation in a coordinated access point transmission session over the wireless medium;

allocate, to each AP of the one or more selected APs, a unique portion of the frequency bandwidth for transmissions to or from the respective selected AP during the TXOP obtained by the first AP;

reserve an unallocated portion of the frequency bandwidth for transmissions to or from the first AP during the TXOP;

transmit, to each of the one or more selected APs, control information indicating the unique portion of the frequency bandwidth allocated by the first AP to the respective selected AP;

transmit a frame to one or more wireless stations associated with the first AP, the frame including synchronization information for temporally aligning the one or more wireless packets transmitted or received by each of the selected APs to or from the wireless stations associated with the respective selected APs with the one or more wireless packets transmitted or received by the first AP to or from the wireless stations associated with the first AP; and transmit or receive one or more wireless packets to or from the one or more wireless stations associated with the first AP over the reserved portion of the frequency bandwidth concurrently with the transmission or reception of at least portions of one or more wireless packets by the selected APs to or from one or more wireless stations associated with the respective selected APs over their respective allocated portions of the frequency bandwidth.

18. The first AP of claim 17, wherein transmitting the control information comprises transmitting a non-legacy trigger frame variant that includes a plurality of legacy frame duplicates on a plurality of respective sub-channels of the frequency bandwidth, each legacy frame duplicate including a bitmap that includes indications of the unique portions of the frequency bandwidth allocated by the first AP to the respective selected APs.

19. The first AP of claim 17, wherein the control information further includes one or more of a duration of the TXOP, a maximum number of spatial streams to be used for transmissions during the TXOP, a maximum number of wireless stations for each of the selected APs for transmissions during the TXOP, a maximum packet duration for wireless packets transmitted during the TXOP, or a maximum transmit power level for transmitting wireless packets during the TXOP.

20. The first AP of claim 17, wherein execution of the processor-readable code is further configured to:
receive, from at least one of the wireless stations associated with the first AP or the one or more selected APs, a power measurement based on the transmitted frame.

21. The first AP of claim 17, wherein the frame solicits concurrent uplink (UL) transmissions over the reserved portion of the frequency bandwidth, the method further comprising:
receiving, from the one or more wireless stations associated with the first AP, UL data transmitted on corresponding resource units (RUs) within the reserved portion of the frequency bandwidth.

22. The first AP of claim 21, wherein during the TXOP the first AP receives the UL data on the reserved portion of the frequency bandwidth concurrently with the reception of UL data by the one or more selected APs on their respective allocated portions of the frequency bandwidth.

23. The first AP of claim 17, wherein the transmitting or receiving of the one or more wireless packets to or from the one or more wireless stations associated with the first AP over the reserved portion of the frequency bandwidth comprises:
transmit downlink (DL) data on the reserved portion of the frequency bandwidth concurrently with DL data transmissions from the one or more selected APs on their respective allocated portions of the frequency bandwidth; and
receive, from the one or more wireless stations associated with the first AP, acknowledgement (ACK) frames on corresponding resource units (RUs) of the reserved portion of the frequency bandwidth.

24. The first AP of claim 17, wherein the control information is transmitted in the frame.

25. A first wireless access point (AP), comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
transmit an intent to participate in a coordinated access point transmission session on a wireless medium during a transmit opportunity (TXOP) obtained by a second AP belonging to a second BSS;
receive first control information indicating a unique portion of a frequency bandwidth allocated by the second AP for the transmission or reception of wireless packets by the first AP to or from wireless stations associated with the first AP and belonging to the first BSS during the TXOP;
transmit, to one or more of the wireless stations belonging to the first BSS, an indication of the unique portion of the frequency bandwidth allocated by the second AP for the transmission or reception of wireless packets by the first AP to or from the wireless stations associated with the first AP and belonging to the first BSS; and
transmit or receive one or more wireless packets to or from the one or more wireless stations associated with the first AP and belonging to the first BSS over the unique portion of the frequency bandwidth allocated by the second AP concurrently with the transmission or reception of at least portions of one or more wireless packets by the second AP to or from one or more wireless stations associated with the second AP and belonging to the second BSS over one or more unallocated portions of the frequency bandwidth.

26. The first AP of claim 25, wherein transmitting the second control information comprises transmitting a non-legacy trigger frame variant that includes a plurality of legacy frame duplicates on a plurality of respective sub-channels of the frequency bandwidth, each legacy frame duplicate including a bitmap that includes an indication of the unique portion of the frequency bandwidth allocated by the second AP.

27. The first AP of claim 25, wherein the second control information further includes one or more of the size and location of the unique portion of the frequency bandwidth allocated by the second AP, a duration of the TXOP, a maximum number of spatial streams to be used for transmissions during the TXOP, a maximum number of wireless stations for each AP of the first AP and the second AP for transmissions during the TXOP, a maximum packet duration for wireless packets transmitted during the TXOP, or a maximum transmit power level for transmitting wireless packets during the TXOP.

28. The first AP of claim 25, wherein the first control information further includes one or more of a duration of the TXOP, a maximum number of spatial streams to be used for transmissions during the TXOP, a maximum number of wireless stations for each of the first AP and the second AP for transmissions during the TXOP, a maximum packet duration for wireless packets transmitted during the TXOP, or a maximum transmit power level for transmitting wireless packets during the TXOP.

29. The first AP of claim 25, wherein execution of the processor-readable code to transmit or receive is further configured to:
transmit a trigger frame allocating one or more unique resource units (RUs) within the allocated portion of the frequency bandwidth to each wireless station of the one or more wireless stations associated with the first AP and belonging to the first BSS; and receive uplink (UL) data from the one or more wireless stations associated with the first AP and belonging to the first BSS on the respective RUs allocated by the first AP.

30. The first AP of claim 25, wherein execution of the processor-readable code to transmit or receive is further configured to:

transmit downlink (DL) data to the one or more wireless stations associated with the first AP and belonging to the first BSS over the unique portion of the frequency bandwidth allocated by the second AP concurrently with DL data transmissions from the second AP on one or more unallocated portions of the frequency bandwidth; and receive acknowledgment frames from the one or more wireless stations associated with the first AP and belonging to the first BSS on corresponding resource units (RUs) of the unique portion of the frequency bandwidth allocated by the second AP.

\* \* \* \* \*